Sept. 18, 1962 J. SCHMIDT ET AL 3,054,728
DRY DISTILLATION PROCESS AND APPARATUS
Filed March 22, 1957 22 Sheets-Sheet 2
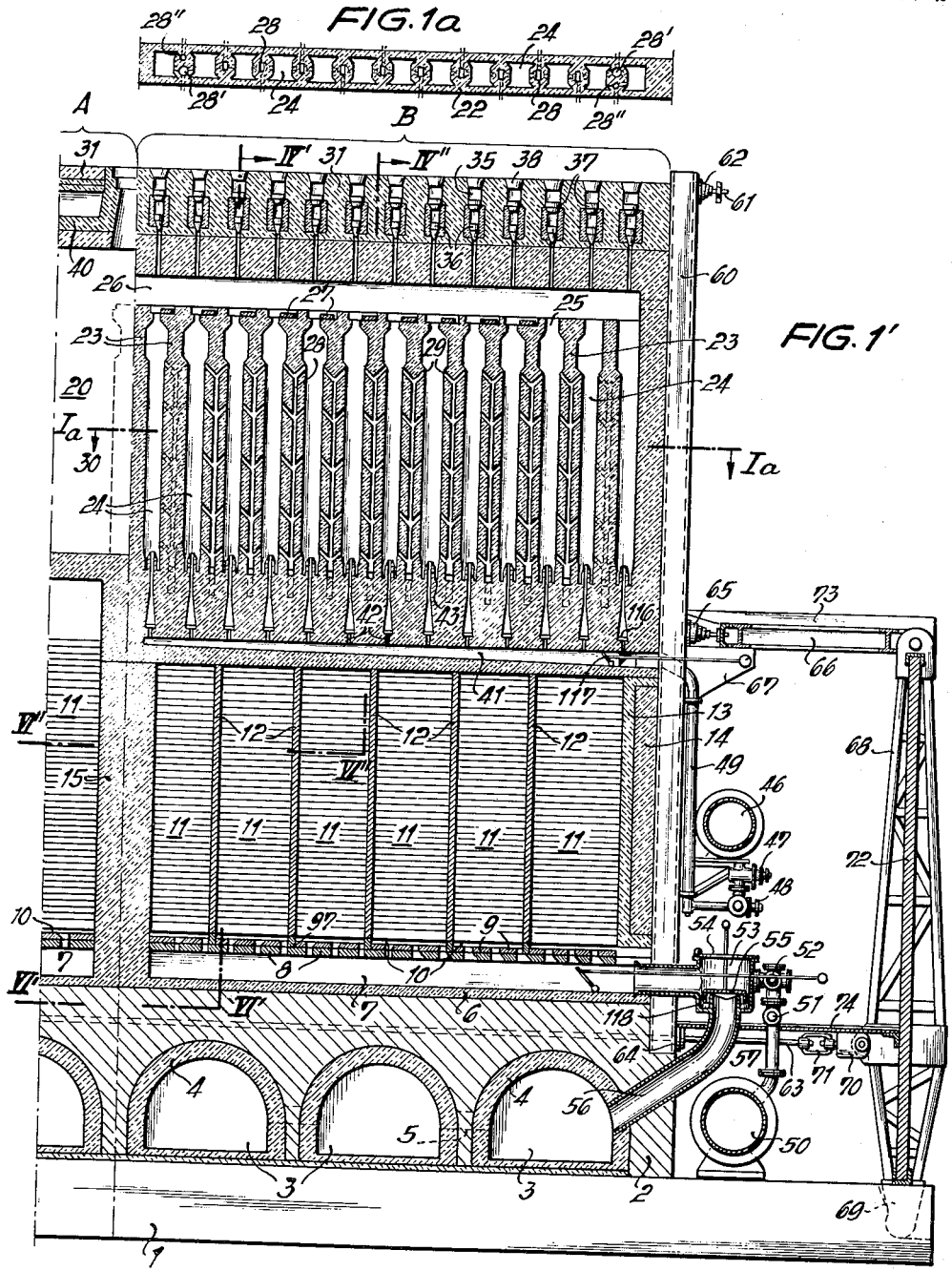
INVENTORS
JOSEF SCHMIDT
THEODOR SCHNEIDER
FRIEDRICH THIERSCH
JOHANNES KNAPPSTEIN
OTTO MARTIN STÜHRMANN
RUDOLF EICKEMEYER
HEINRICH VOLL
BY Leon M. Strauss

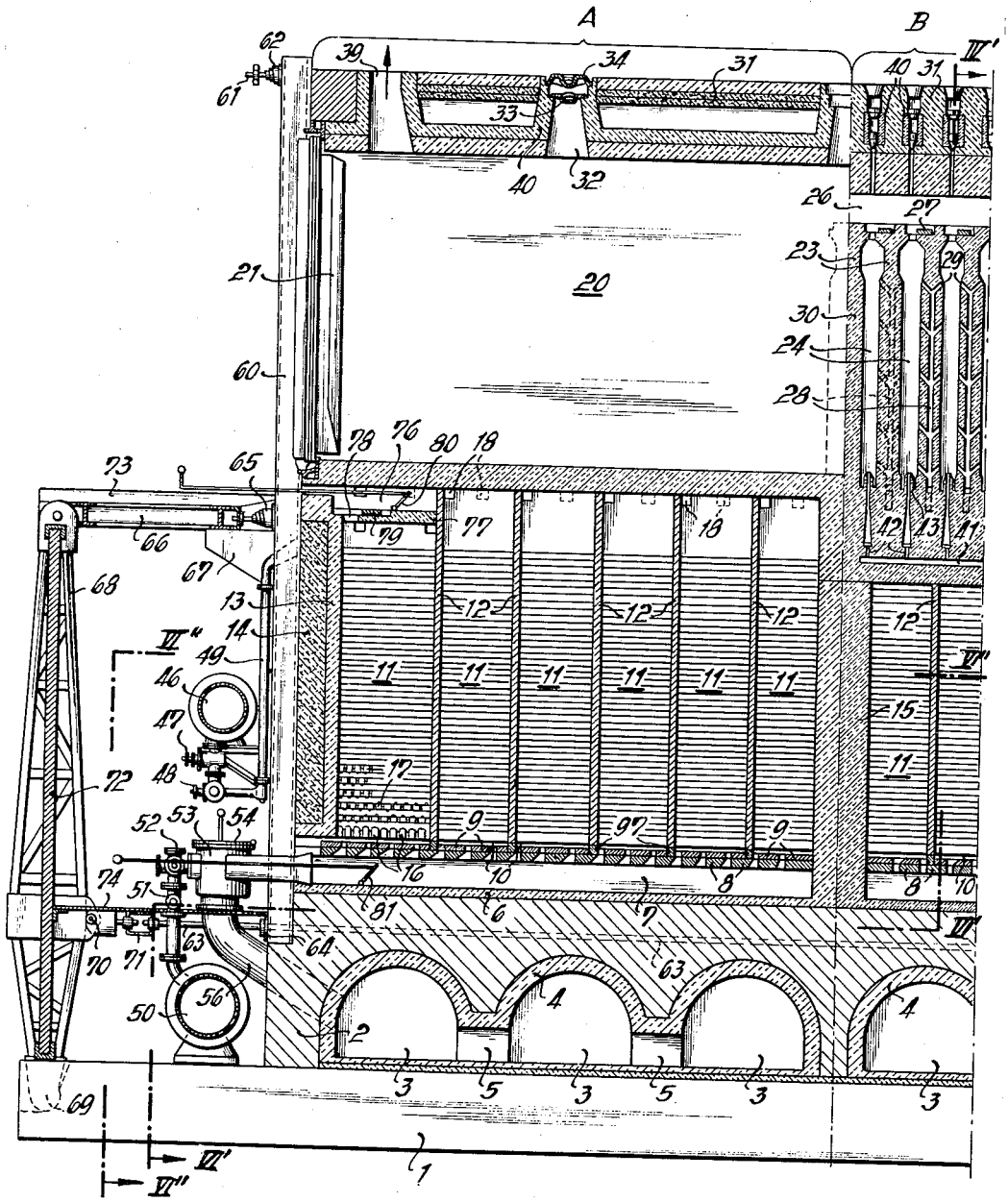

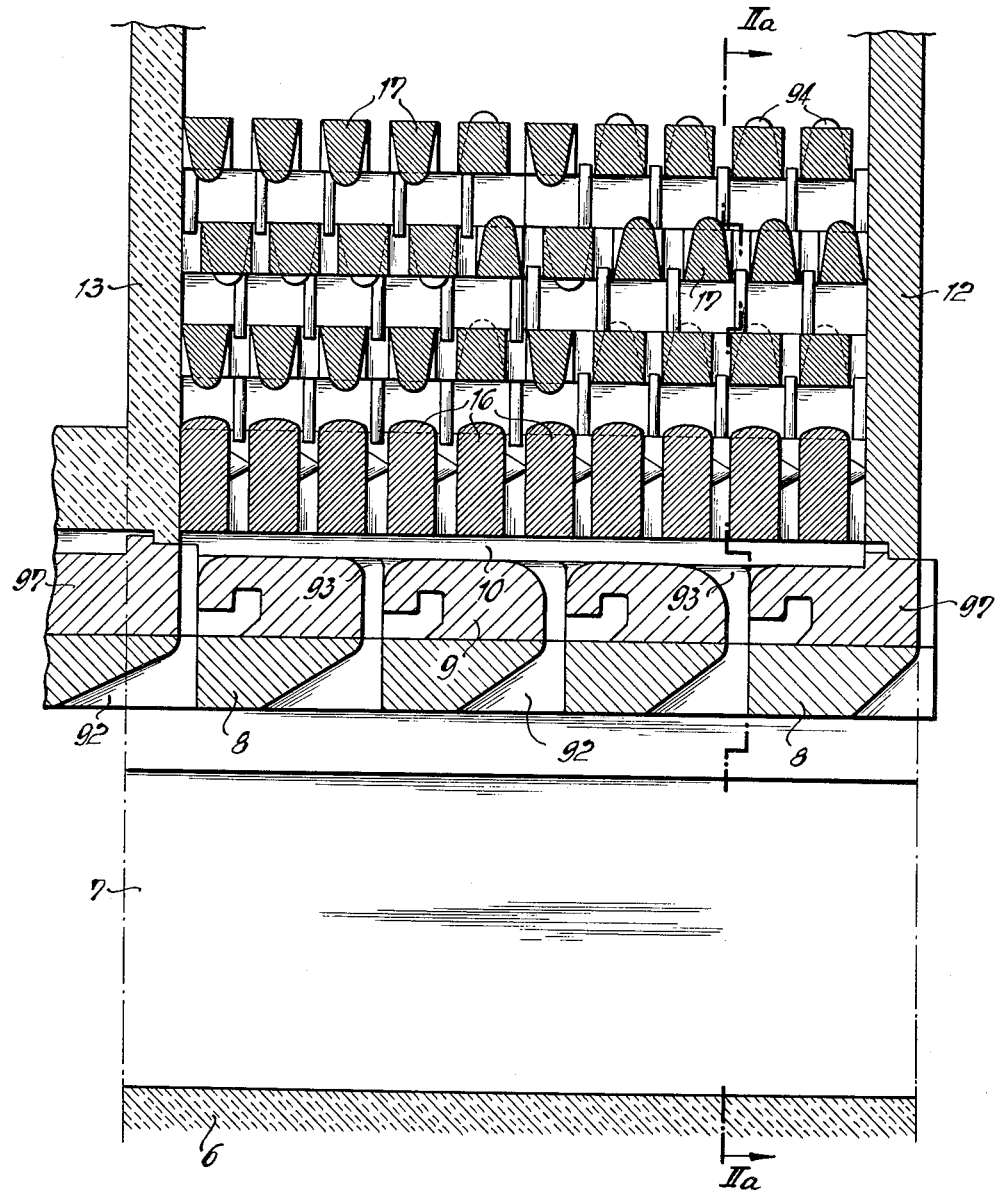

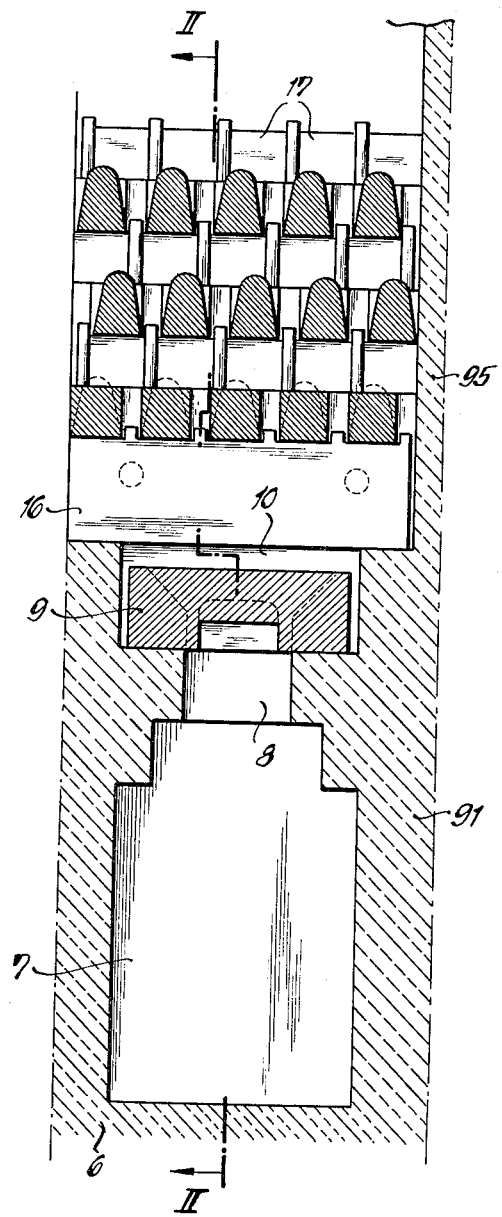

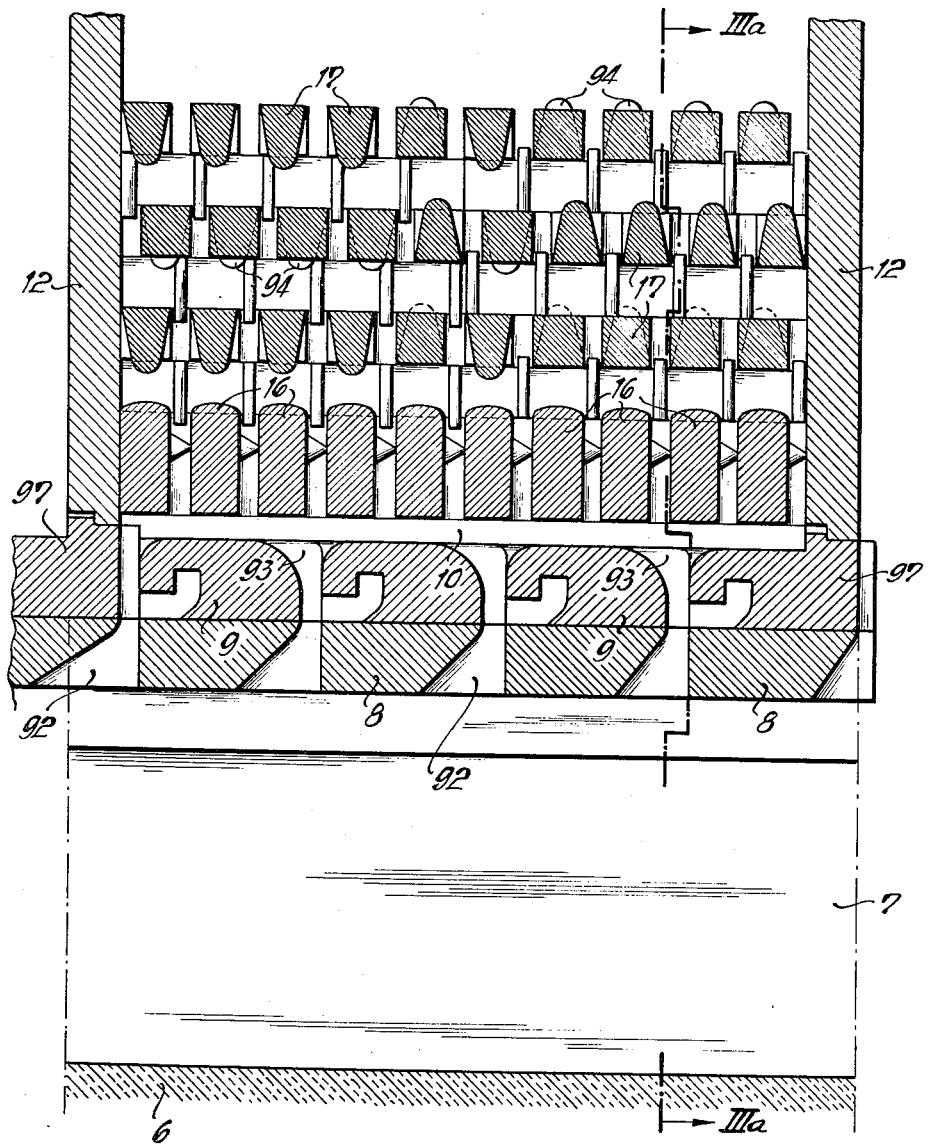

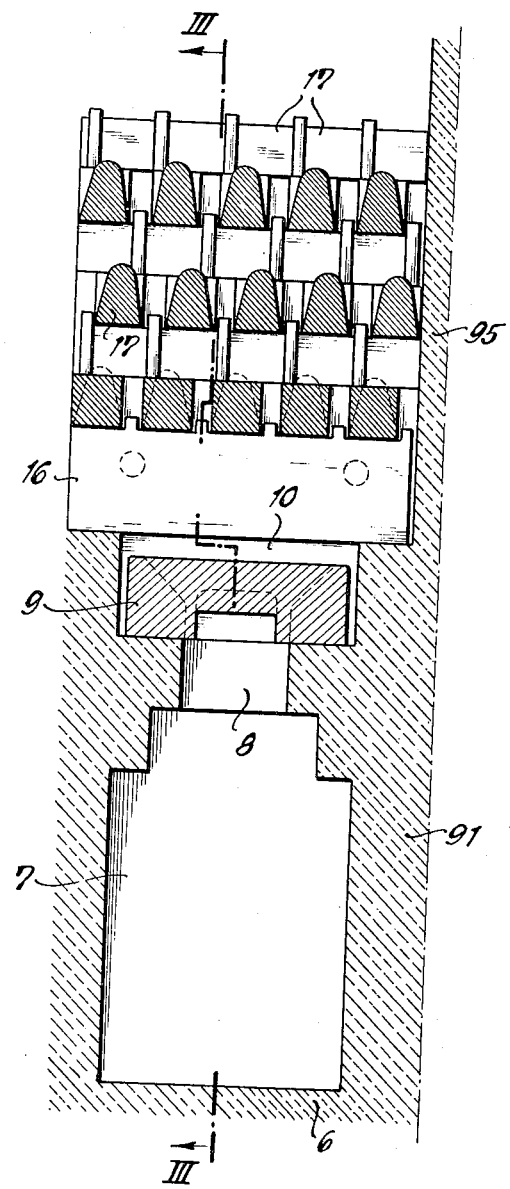

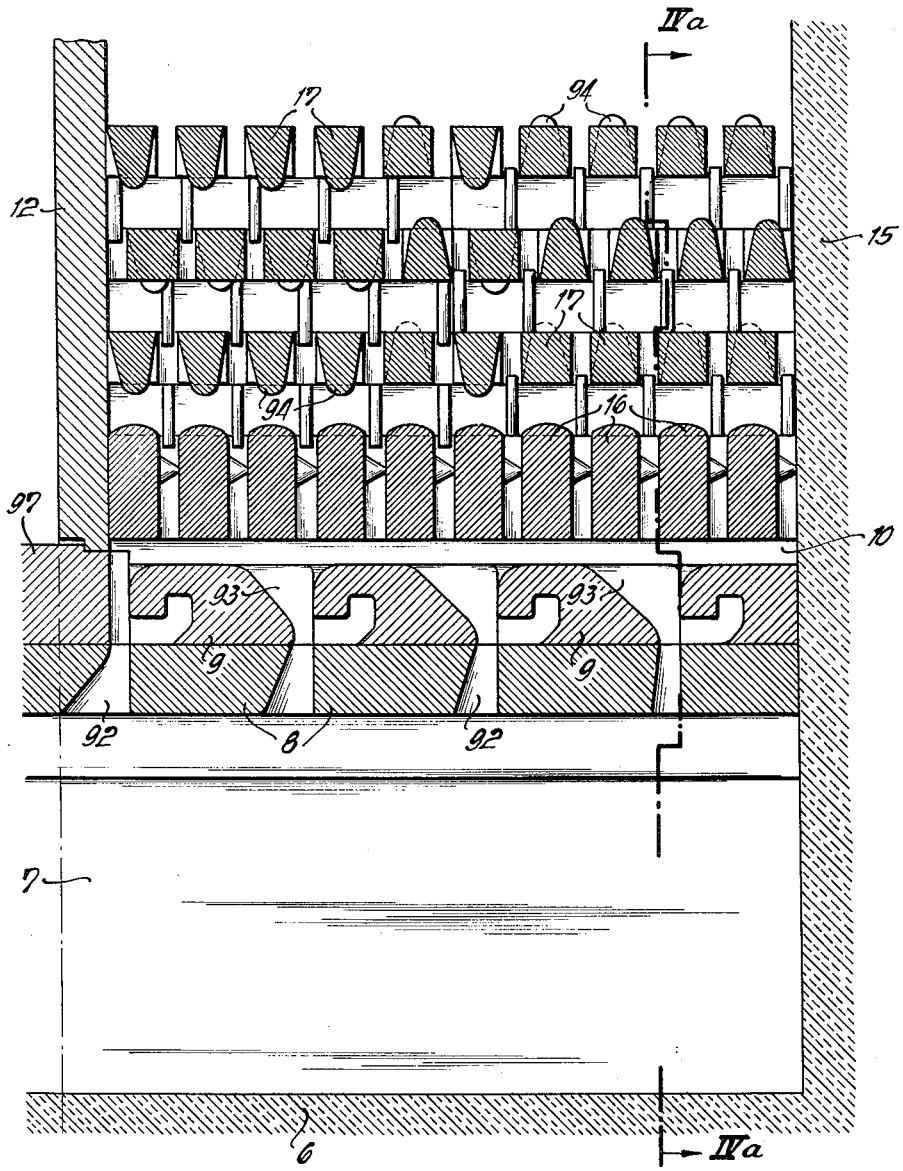

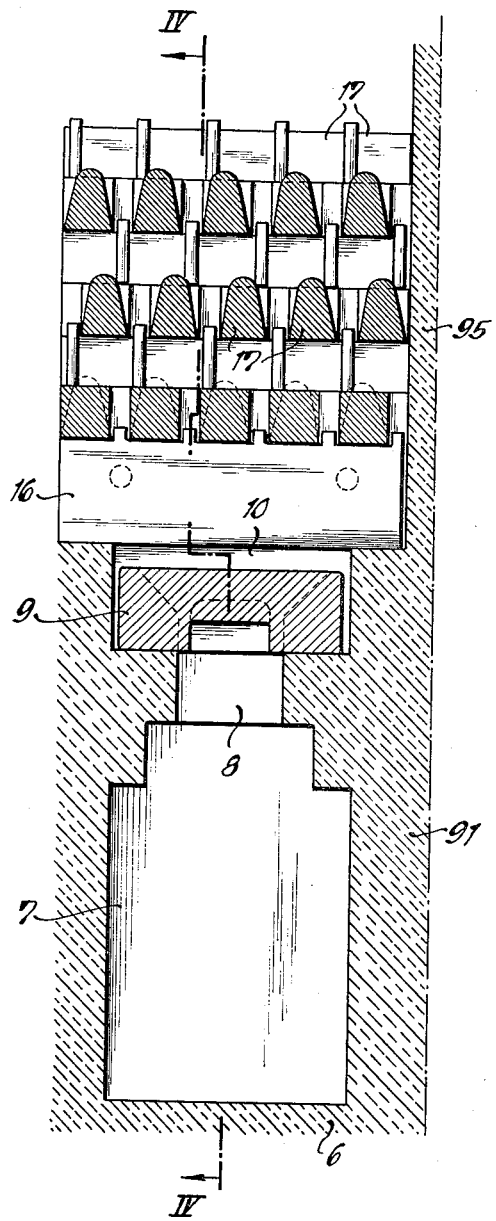

Sept. 18, 1962    J. SCHMIDT ET AL    3,054,728
DRY DISTILLATION PROCESS AND APPARATUS
Filed March 22, 1957    22 Sheets-Sheet 9
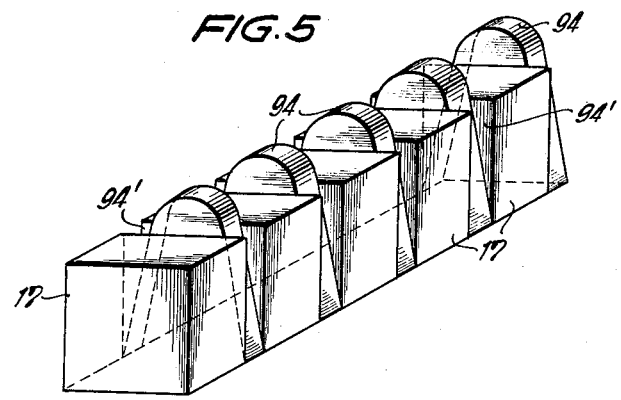
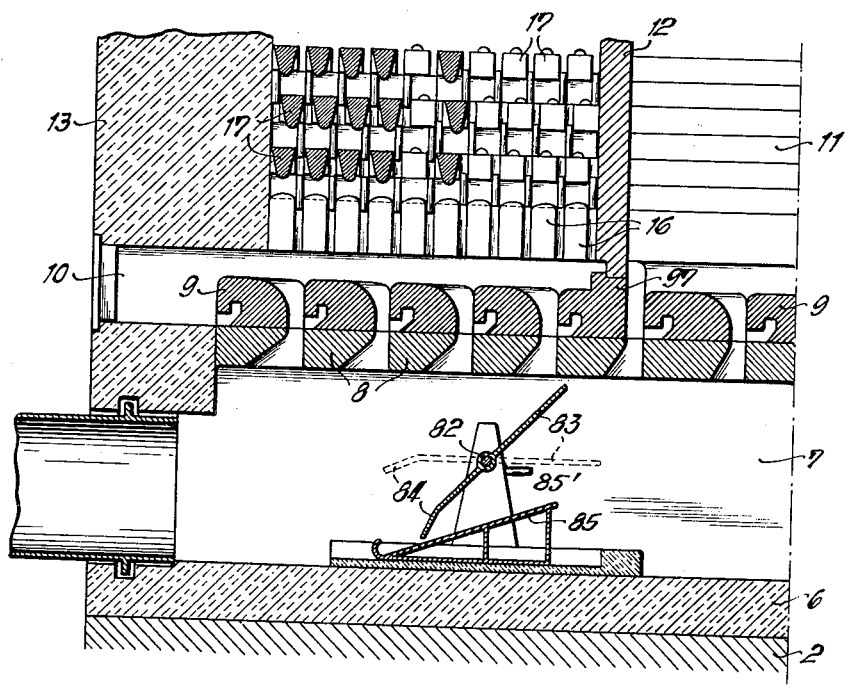
INVENTORS:
JOSEF SCHMIDT
THEODOR SCHNEIDER
FRIEDRICH THIERSCH
JOHANNES KNAPPSTEIN
OTTO MARTIN STÜHRMANN
RUDOLF EICKEMEYER
HEINRICH VOLL
BY

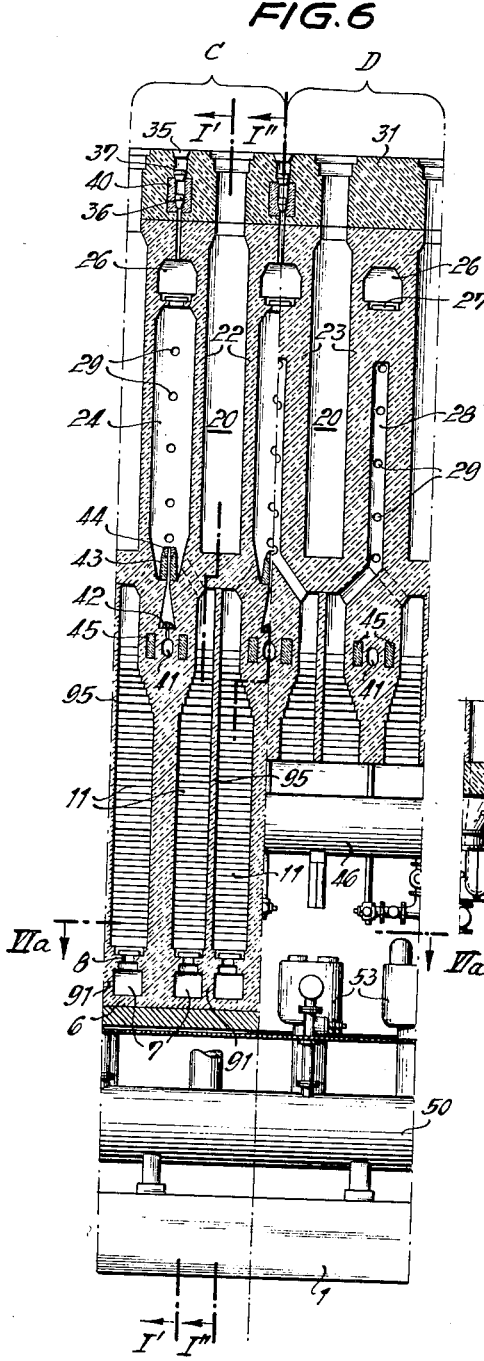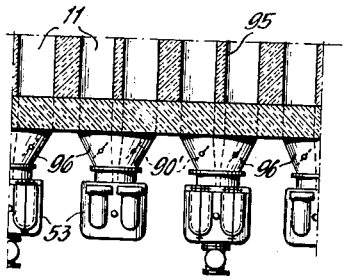

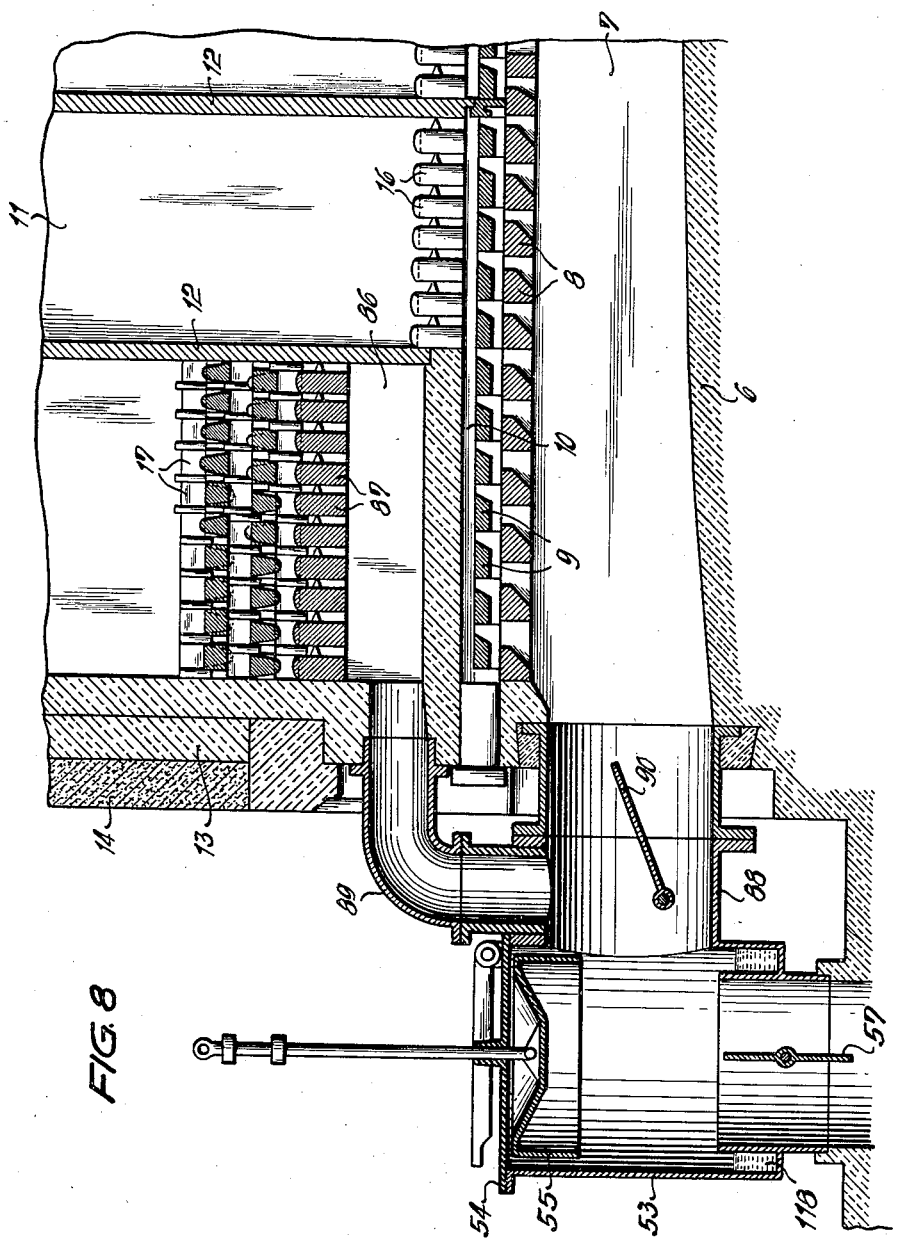

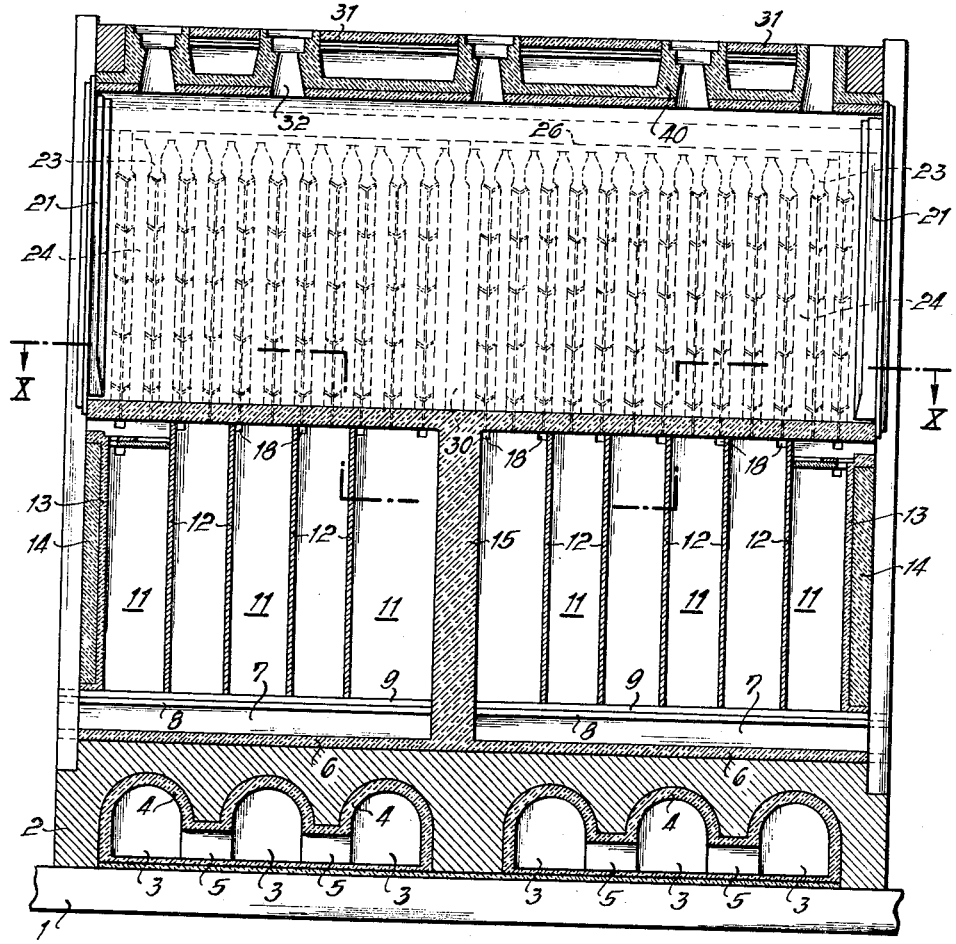
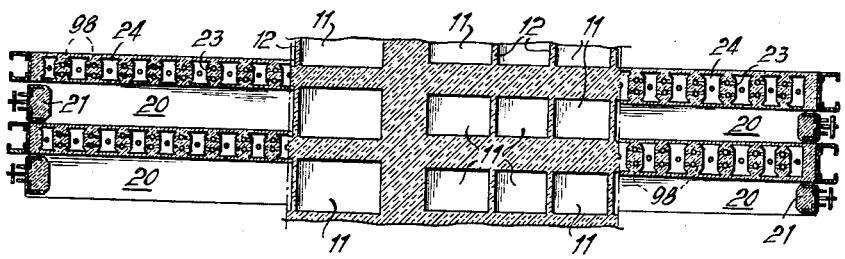

Sept. 18, 1962  J. SCHMIDT ET AL  3,054,728
DRY DISTILLATION PROCESS AND APPARATUS
Filed March 22, 1957  22 Sheets-Sheet 15
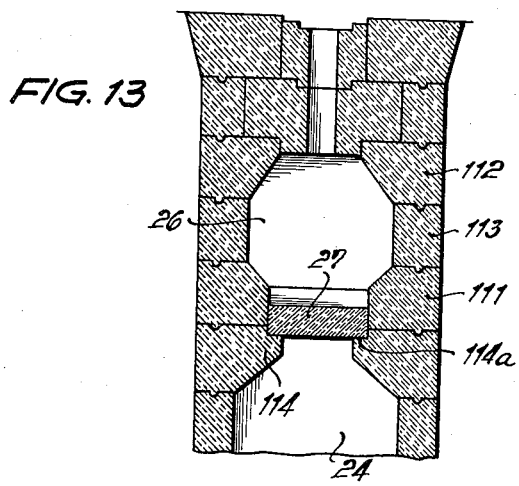
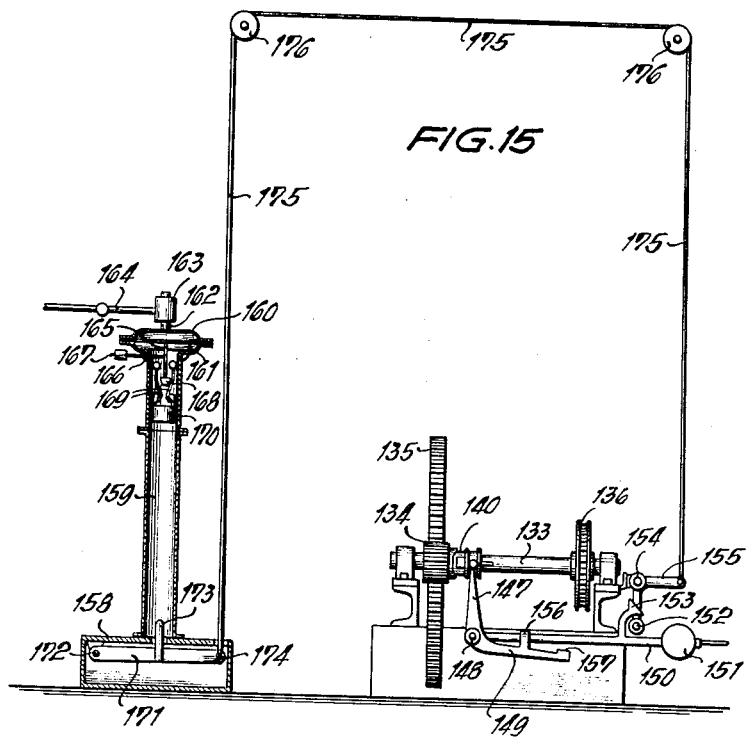
INVENTORS:
JOSEF SCHMIDT
THEODOR SCHNEIDER
FRIEDRICH THIERSCH
JOHANNES KNAPPSTEIN
OTTO MARTIN STÜHRMANN
RUDOLF ENGEMEYER
HEINRICH VOLL Sept. 18, 1962 J. SCHMIDT ET AL 3,054,728
DRY DISTILLATION PROCESS AND APPARATUS
Filed March 22, 1957 22 Sheets-Sheet 17

INVENTORS:
JOSEF SCHMIDT
THEODOR SCHNEIDER
FRIEDRICH THIERSCH
JOHANNES KNAPSTEIN
OTTO MARTIN STÜHRMANN
RUDOLF EICKENEYER
HEINRICH VOLL

Sept. 18, 1962    J. SCHMIDT ET AL    3,054,728
DRY DISTILLATION PROCESS AND APPARATUS
Filed March 22, 1957    22 Sheets-Sheet 18

INVENTORS:
JOSEF SCHMIDT
THEODOR SCHNEIDER
FRIEDRICH THIERSCH
JOHANNES KNAPPSTEIN
OTTO MARTIN STÜHRMANN
RUDOLF EICKEMEYER
HEINRICH VOLL

Sept. 18, 1962  J. SCHMIDT ET AL  3,054,728
DRY DISTILLATION PROCESS AND APPARATUS
Filed March 22, 1957  22 Sheets-Sheet 19

INVENTORS:
JOSEF SCHMIDT
THEODOR SCHNEIDER
FRIEDRICH THIERSCH
JOHANNES KNAPSTEIN
OTTO MARTIN STÜHRMANN
RUDOLF EICKEMEYER
HEINRICH VOLL

Sept. 18, 1962   J. SCHMIDT ET AL   3,054,728
DRY DISTILLATION PROCESS AND APPARATUS
Filed March 22, 1957   22 Sheets-Sheet 20

INVENTORS:
JOSEF SCHMIDT
THEODOR SCHNEIDER
FRIEDRICH THIERSCH
JOHANNES KNAPRSTEIN
OTTO MARTIN STÜRMANN
RUDOLF EICKEMEYER
HEINRICH VOLL
BY

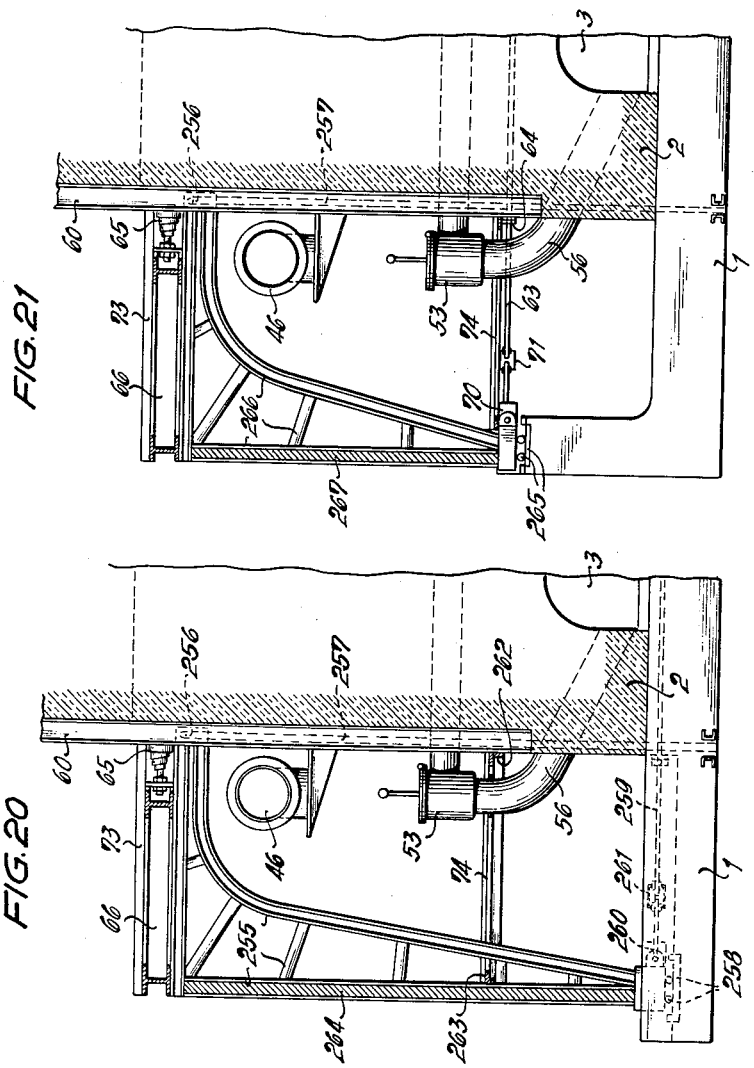

Sept. 18, 1962 J. SCHMIDT ET AL 3,054,728
DRY DISTILLATION PROCESS AND APPARATUS
Filed March 22, 1957 22 Sheets-Sheet 22
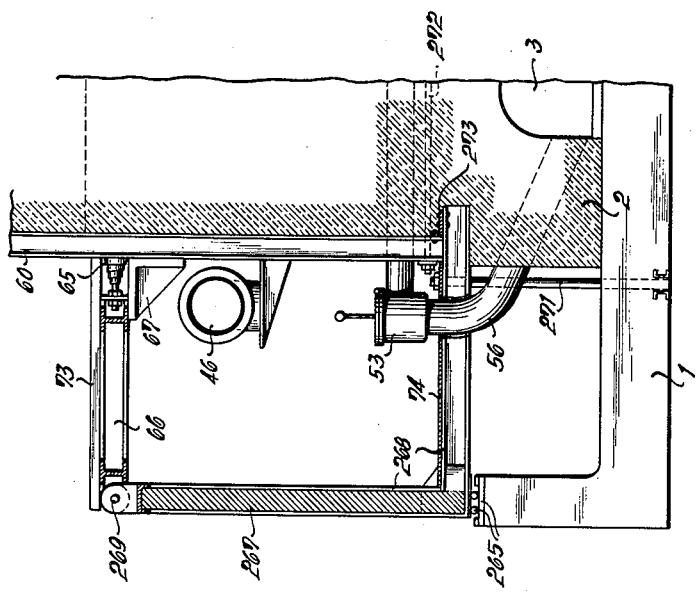
INVENTORS:
JOSEF SCHMIDT
THEODOR SCHNEIDER
FRIEDRICH THIERSCH
JOHANNES KNAPPSTEIN
OTTO MARTIN STÜHRMANN
RUDOLF EICKEMEYER
HEINRICH VOLL
BY United States Patent Office 3,054,728
Patented Sept. 18, 1962

3,054,728
DRY DISTILLATION PROCESS AND APPARATUS
Josef Schmidt, Theodor Schneider, and Friedrich Thiersch, Recklinghausen, Johannes Knappstein, Datteln, and Otto Martin Stuhrmann, Rudolf Eickemeyer, and Heinrich Voll, Recklinghausen, Germany, assignors to Carl Still, Recklinghausen, Germany, a firm
Filed Mar. 22, 1957, Ser. No. 647,799
Claims priority, application Germany Mar. 26, 1956
9 Claims. (Cl. 202—144)

The present invention relates to improved apparatus for the dry distillation of coals, lignites and peat, or briquettes thereof, pitch, pitch granulate and the like or any mixtures of such substances, if requisite with coke fines, in horizontal regenerative coking ovens, heated by rich gas or lean gas as preferred, and having vertical heating flues which are heated in an upward direction by flames in alternate groups, the upper ends of said flues being connected by a horizontal duct, with heating flues of groups in which the current is downwards.

More particularly, such distillation, according to the invention, is effected in horizontal regenerative coke-ovens selectively fired with rich or lean gas and having vertical heating flues which are alternately flamed upward in groups and are at their upper ends connected by a horizontal duct with other heating flues through respective groups of which gases stream downwardly.

It is important in such ovens that the heating walls lying on either side of the coking chambers are kept as far as possible at uniform temperatures. This means distributing the heating gases along the length of the coking chambers or the heating wall in such a way that as far as possible uniform temperatures are obtained in the coke cake, and it is also important to obtain a corresponding favorable play of the flame on the heating walls over the whole height of the coking chamber.

These objectives are achieved according to the invention by the following characteristic features:

Lean gas or air is distributed either uniformly or according to a predetermined formula or operational law through bottom duct or sole flue channel means under each respective regenerator parallel to the longitudinal axis of the coking chamber over the entire area of the grating of the regenerator through a grate located between the bottom duct and the regenerator, and/or possibly from the outside through slide blocks displaceable on the grate and provided with nozzle-like or conical apertures, so that also the exhaust gases flowing out of the regenerators upon reversal of the direction of flow are distributed uniformly or according to a predetermined formula or law on the entire checkerwork or grating of the various regenerators.

According to a further aspect of the invention, in addition to or in lieu of the foregoing, the ascending lean gas or air stream on the one hand and the descending exhaust gas stream on the other hand are conducted in the regenerators by suitably shaped checker blocks preferably of identical design, which are so arranged side by side and in superposition that according to a predetermined formula the ascending stream is favored at the lean gas or air inlet side of the regenerator opposite the portion of the latter farther away from said inlet side, while conversely the descending stream of the exhaust gases is favored at the portion of the regenerator located farther inside the furnace.

Through ducts with calibrated apertures leading to the heating flues at different levels or elevations, which ducts are arranged in the binders of the heating walls, lean gas or air flows from the regenerators to the heating flues which are subdivided into a plurality of vertically spaced stages, the cross-sections of the calibrated apertures remaining the same from the bottom to the top or being preferably dimensioned differently according to a predetermined formula or law, and lean gas and air enter the heating flues through apertures preferably located at the same level.

In the case of rich-gas firing, the rich gas passes from a horizontal duct arranged between regenerators and heating flues from below into the upwardly flamed heating flues through calibrated nozzles, while the combustion air preheated in the regenerators gets into these heating flues through the binder ducts and their differently elevated calibrated lateral apertures. The concept of this invention includes the employment of a horizontal regenerating oven for dry distillation comprising a retort having vertical flues arranged in groups, the flues of alternate groups being heated upwardly by flames and being connected at their upper ends by a horizontal channel with the flues of groups in which the flow is downwards, regenerators arranged parallel to said retort with one or more vertical intermediate walls which allot a given regenerator section to a given number of heating flues, change-over devices for effecting the regenerative reversing process, slide blocks arranged on a distribution grate between said regenerator sections and the sole flue of said regenerator sections, nozzle-like or conical openings provided in said slide blocks, said openings being so dimensioned and positioned that lean gas or air flowing from said sole flue upwardly through said regenerator sections to said sole flue is distributed in an optimum manner over the whole grating of each regenerator.

Said projections are so arranged that the upward flow of lean gas or air is favored at the inlet end of the oven while the downward flow of waste gas is favored in the part of the regenerator lying further within the oven.

Between the slide blocks shut-off slide are arranged which shut off or subdivide the slide channel at the regenerator partitions, connecting channels leading from the regenerator sections to the heating flues each connecting channel having apertures located at different levels and so calibrated that a uniform coking over the whole height of the retort is obtained, in connecting members between said heating flues, the connecting member lying at the flow reversing point being made solid while the adjacent connecting members on each side and preferably also the connecting members lying next to the oven ends each have two channels, one of which is connected to two adjacent heating flues through apertures located at different levels and calibrated accordingly, and the other of which, if necessary with half the cross-section of said one channel is connected only to the heating flue adjacent to each oven end, and a rich gas inlet channel arranged between the heating flues and the regenerators, said rich gas inlet channel opening into the heating flues through calibrated nozzles each provided as requisite with an interchangeable protective nozzle, and all said heating flues being connected through suitable calibrated openings located at different levels via the connecting channels with the regenerators through which combustion air is admitted.

Further, it may be expedient to use an oven wherein the gratings of the regenerators are formed of blocks laid one upon the other, said blocks being of substantially square section and of a length depending on the width of the regenerators and each having on one side a number of lug-like projections which serve for spacing the blocks and for differentiating the flow resistance in different directions in the regenerators.

These and other objects of the invention will become further apparent from the following detailed description, reference being made to the accompanying drawings, showing preferred embodiments of the invention.

In the drawings:

FIG. 1–FIG. 1' illustrate a cross-sectional elevational view of a compound coke oven battery or distillation system constructed in accordance with the present invention, the coking chamber being shown in section on the left and the heating wall on the right side of the system, the portions A and B of FIG. 1 being cross-sectional views taken, respectively, along the lines I'—I' and I"—I" in FIG. 6;

FIG. 1a is a cross-sectional view taken along the line Ia—Ia in FIG. 1;

FIGS. 2, 2a, 3, 3a, 4 and 4a are sectional views on an enlarged scale of the lowermost portions of a regenerator of the type shown in FIG. 1, FIGS. 2, 3 and 4 being cross-sectional views taken along the lines II—II, III—III and IV—IV in FIGS. 2a, 3a and 4a, respectively, and FIGS. 2a, 3a and 4a being sectional views taken along the lines IIa—IIa, IIIa—IIIa and IVa—IVa in FIGS. 2, 3 and 4, respectively, FIGS. 2 and 2a showing the lean gas or air inlet of the regenerator, FIGS. 3 and 3a showing a central portion of the regenerator, and FIGS. 4 and 4a showing a portion of the regenerator located at the center of the furnace adjacent the end of the bottom duct;

FIG. 5 shows in perspective the uniformly employed checker block form;

FIG. 6 shows a composite, partly longitudinal section through the system, from which the relative arrangement of the coking chambers, heating walls and regenerators is visible, the portions C and D of FIG. 6 being cross-sectional views taken, respectively, along the lines VI'—VI' and VI"—VI" in FIG. 1;

FIG. 6a is a cross-sectional view taken along the line VIa—VIa in FIG. 6 and illustrates a detail of the structure employed for the introduction of lean gas or air into the regenerators which are subdivided by longitudinal center walls;

FIG. 7 is a sectional view of a part of the bottom duct and illustrates a particular design of a throttle valve operatively disposed in the bottom duct;

FIG. 8 is a partly sectional, schematic view of one type of head firing means;

FIG. 9 is a sectional illustration of a special arrangement and distribution of the heating walls and regenerators effected in consideration of the conicity of the coking chambers;

FIG. 10 is a cross-sectional view taken along the line X—X in FIG. 9;

FIG. 11b is a cross-sectional view taken along the line XIb—XIb in FIG. 11a;

FIG. 13 is a sectional illustration of the block arrangement of the horizontal duct over the heating flues;

FIG. 15 is a diagrammatic illustration of a gas deficiency safety device;

FIG. 16 is a schematic illustration of a hydraulic or pneumatic reversing system for the change-over valves of the battery of coke-ovens together with a gas deficiency safety arrangement;

FIG. 17b is a cross-sectional view taken along the line XVIIb—XVIIb in FIG. 17a;

FIGS. 20, 21 and 22 illustrate various embodiments of the center support of the furnace head anchor posts.

Figure 11A:
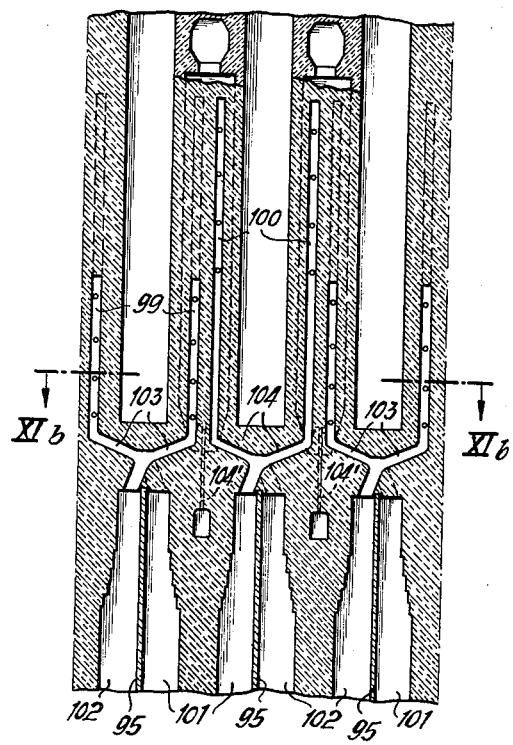
FIG. 11a is a sectional illustration of one type of heating wall binders each of which is provided with two ducts, one of the latter being short and the other long, the view being taken along the line XIa—XIa in FIG. 11b.

The construction of the coke oven battery is shown by way of example in FIG. 1 in cross-section. The whole battery is built up on a rigid foundation plate 1. On this is erected a foundation block 2, which contains a large number of flue gas channels 3. These channels are lined with a refractory brick layer 4 and half the number of these each connected with channels 5. Above the foundation block 2 lies a layer of refractory blocks 6, in which the sole flues 7 are embedded. Above the sole flues 7 is arranged a grate 8 over which lie the sliding bricks 9 movable from outside in a sliding channel 10. Above two sole flues 7 each lies a regenerator 11, which is sub-divided by intermediate walls 12. The regenerators are bounded at the oven head by the layer of refractory blocks 13 with an insulating block layer 14. In the middle of the oven the regenerators and sole flues are sub-divided by the refractory center wall 15. On the grate blocks 16 lying above the slide channel 10 are built up the grating blocks or checker work 17 of the individual regenerator sections, as can be seen in detail in FIGS. 2 to 5.

The gas or air preheated in the individual regenerator divisions 11 leaves through the openings 18 at their upper ends and arrives at the heating walls arranged above.

Immediately above each regenerator lies a coking chamber 20, which is closed at the head ends by doors 21 as shown on the left hand side of FIG. 1 (Section I—I).

The coking chambers 20 are bounded by the walls 22, which are interconnected by the connecting members 23 to the closed masonry connecting system of the heating walls. Between the connecting members 23 are located the heating flues 24, which after being brought to calibrated size pass at their upper ends into the horizontal channel 26. The sliding blocks 27 provided above the openings 25 can be used for fine adjustment of the heating gas distribution. With the openings 18 in the upper part of the regenerators are connected the channels 28 arranged in the connecting members 23, from which channels outlet channels 29 calibrated according to a given law for an equal heating over the whole height of the coke charge discharge into the heating flues 24 at various heights. The horizontal channel 26 leads the heating gases into the heating flues through which the current is downwards, located on the other side of the center connecting member 30. The oven top 31 arranged above the coking chambers and heating walls consists of refractory, insulating and ordinary brick layers.

It has been found very effective in economizing the heat energy to be supplied, to reduce the radiation losses thereby to a minimum, to provide the feed openings 32 of the oven chamber with double covers 33, 34 and to close the inspection apertures 35 to the individual heating flues with two plugs 36 and 37, while the upper cover 38 finally is fitting flat with the top of the oven. In this connection it is desirable to fit both covers 33, 34 of the feed apertures 32 on the fire side with an insulating layer, preferably of graphite, which should also be sufficiently resistant to rough treatment. Furthermore all the hole framings, both over the coking chambers 20 including the ascending pipe openings 39, and also above the heating walls are formed by insulating brick layers 40. Alporite metal can be used here, for example.

The corresponding rich gas supply can be effected through the channel 41, led from the branch openings with calibrated nozzles 42 to the individual heating flues. The rich gas enters the heating flues through what are termed guard nozzles 43, which can be made interchangeable if required. In corresponding conical apertures of the guard nozzles 43 interchangeable nozzles 44 can also be inserted for the purpose of final calibration. The horizontal rich gas supply channel 41 is thereby insulated on both sides from the adjacent hot regenerator walls, by insulating brick layers 45 so that too strong a heating of the rich gas in the hot masonry is avoided.

The rich gas feed is effected through the collecting pipe 46, from which the individual heating walls (through the channel 41) are supplied with rich gas through the change-over valve 47 and the adjustment valve 48 together with the pipe 49.

The change-over valves 47 are preferably made in such a way that in their closed position they leave an opening free to allow air to enter via the pipe 49, the channel 41 and the connected branch pipes into the heating flues 24, so that the rich gas may be displaced and the pipes cooled.

The lean gas feed is effected through the collecting pipe 50, from which the waste heat pots 53 and two sole flues 7 of each of these are supplied with lean gas through the adjustment valves 51 and the change-over valves 52. The waste heat pots 53 have air valves 54 and immersion bells 55, which can close the waste heat pipe 56 from the flue gas channels 3. A throttle valve 57 may also be fitted in the waste heat pipe 56.

Two strong buck stays 60 are fitted to each of the two oven heads as a termination of each heating wall, which buck stays are held together at the top by tie rods 61 with spring fittings 62 and at their lower ends are connected by tie rods 63 with adjustable nuts 64.

To stiffen the buck stays 60 against the expansion due to heat of the oven and regenerator blocks and to absorb the horizontal forces of the ram machine the lattice girders 66 engage substantially in the middle on both sides of the oven block through the springs 65.

These lattice girders 66 rest at one end on brackets 67 fitted to the buck stays 60, and are articulately connected at the other end to the lever type support 68. The lower end 69 of the lever type support 68 is supported on the extended foundation plate 1. It is, however, also possible to bend the lever type support 68 in such a way that it is supported direct on the unextended foundation plate 1, which is then joined flat with the foundation block 2. The horizontal arms of the lever type support 68 thus supported on the foundation plate 1 can be connected with a vertical arm either rigidly or articulately. One or more of the tie-rods 63 passing through the oven foundation block engage over the connecting member 70 and the rod strainer 71, and take up the horizontal forces. Between the lever type supports arranged at a distance of 4 to 10 oven chamber units are fitted the wall components 72 which enclose the main passage. On the frame girders 66 rests the main passage cover 73, while the main passage floor 74 is arranged below the waste heat pots and is anchored on one side of the buck stays 60 and on the other side to the master passage side wall 72 or between the lever type supports 68.

In what follows further details and types of embodiment are described with reference to the attached drawings.

According to a further development of the invention, additional lean gas can be led, for reinforcing the heating of the head through an additional horizontal channel 76 fitted between the regenerators and heating flues, to one or more of the heating flues located at the oven head. The horizontal channel in this case is separated by a partition wall 77 from the regenerator section lying below. The partition wall 77 has an aperture 78 located at its head end, the cross-section of which aperture can be adjusted by a sliding block 79 arranged to be movable from the outside.

It is also possible to fit in the horizontal channel 76 between the regenerators and the heating flues after the branch pipe for lean gas to the first heating flue, a throttle valve 80 of corrosion- and heat-resistant material, which can be operated from the outside. A further corresponding valve can also be provided after the branch pipe to the second heating flue. Of course, instead of valves, sliding choke blocks movable from the outside can be arranged to throttle the reinforced lean gas supply according to the setting to the heating flues lying after the first, second or third heating flue.

To reinforce the head heating for the purpose of obtaining uniform temperatures in the coking chamber further lean gas or air can be led to the regenerator chambers for the second or third and the following heating flues through the sole flue 7 from below and thereby be supplied independently of the regenerator chamber reinforced for the first or for the first and second heating flue.

For this purpose, as in FIG. 1, a valve 81 operable from the outside can be used, which is reversed when supplying waste heat to the relevant regenerator and in connection with the reversing process is brought into its once settled adjustment position, when lean gas or air is supplied.

Instead of the valve 81, however, according to FIG. 7, a valve 83 suspended at its centroidal axis 82 is used, which valve has a downward bend 84 at its end opposite the lean gas or air inlet. During the supply of lean gas or air, this bent end 84 rests on an oblique stop surface 85 which is adjustable from outside thus throttling the feed of the fuel to the rear part of the sole flue, while it stands open during reversed supply of waste gas, as indicated by the dotted position in the drawing, and lies against a suitable stop 85'.

The reinforced head heating can also, however, be effected in accordance with FIG. 8 as follows:

To the feed pipe and discharge pipe of lean gas and air or waste heat for the first, or the first and second heating flue, there is provided an additional channel 86 arranged higher than and separate from the sole flue, with a support grating 87 located above the additional channel. This channel is connected to the inlet pipe 88 between the waste heat pot 53 and the sole flue 7 by a branch pipe 89. It is advantageous to arrange, in the current of lean gas or air, in the inlet pipe 88 between the reversing valve and the sole flue after the branch pipe 89 to the additional channel 86, a throttle valve 90 operable from the outside.

As can be seen from FIG. 6 or 6a each regenerator 11 has two sole flues 7, which are divided by a longitudinal partition wall 91 for supporting the distribution grate 8. FIGS. 2 to 4 show a type of embodiment of the grate blocks 8 located over the sole flues in conjunction with the sliding blocks 9 over the grate blocks and also the grating 17 of three separate regenerator sections. FIG. 2 shows thus a regenerator section immediately at the lean gas or air inlet in the sole flue 7, FIG. 3 a center section and FIG. 4 a section at the center of the oven at the end of the sole flue 7.

Having regard to the fact that because of the flow velocity of air or lean gas in the sole flue 7, the entry of the flowing medium into the rear regenerator sections near the center of the oven is favored, the grate slots 92 towards the center of the oven downwards are narrower than at the head of the oven. On the contrary the combustion gases flowing through the horizontal channel 26 arranged above the heating flues have a tendency to prefer the sections of the heating flues or regenerators located at the head of the oven through which the flow is downwards. Accordingly, the slots 93 of the sliding blocks 9 lying above the grate blocks 8, on the side of the waste gas outlet from the sole flue 7, are narrower above and widen out with an increasing taper towards the center of the oven, in order to favor accordingly the outlet of the waste gas in the center of the oven and thereby to obtain a uniform supply of waste gas to all the regenerator sections.

It is naturally also possible to make the grate blocks 8 uniform, if requisite at different distances apart, and only arrange the nozzle-like or conical apertures in the sliding blocks in such a manner that they are wide at the bottom and narrow at the top in the neighborhood of the lean gas or air inlet into the sole flue 7, the taper of these nozzle-like apertures decreasing as the distance from the air or lean gas inlet increases as far as the middle of the regenerators, and in the rear part of the sole flue 7 as far as the end of the regenerator lying below the middle of the oven chamber, the slide block apertures are increasingly wide at the top and narrow at the bottom. It is also possible to make these apertures constricted in the middle, in which case the outflow figures of the transition nozzles from the side of distribution channel 7 in the direction of flow of the combustion mediums which are to be preheated, air or lean gas, are becoming smaller in continuous succession, and from the side of the regenerator 11 in the same direction larger.

Taking into consideration the fact that the volume of waste gas emerging from the regenerators is usually greater than the air or lean gas entering them, it may be of advantage to provide in the distribution grate 8 between the sole flue 7 and regenerator 11 nozzle-like or conical apertures which, at the air or lean gas inlet, are wide at the bottom and narrow at the top and whose conicity decreases with the distance from the air or lean gas inlet as far as the middle of the regenerator and in the rear part of the sole flue as far as the end of the regenerator lying below the center of the oven chamber increase in width above and are narrow below.

The sliding blocks lying above this grate, if requisite movable from the outside, are provided with nozzle-like or conical apertures such that their cross-section next to the distribution grate corresponds with the apertures of this grate and this cross-section preferably widens progressively in the upward direction.

Of course, it is also possible to provide the nozzle-like or conical apertures for uniform distribution of the gases entering or leaving in the fixed grate 8 between the sole flue 7 and the regenerators 11 and to desist from using sliding blocks 9. The sliding block channel 10 can also be eliminated in this case.

The grating blocks 17 preferably made uniformly in accordance with FIG. 5 have a substantially square cross-section with a side of about 50 mm., while their length conforms to the width of the regenerators, and possess unilaterally a number of lug-like projections 94. The volume occupied by the lugs 94 preferably corresponds to that of each two laterally provided slots 94', so that these can be stamped out in the form, for instance, of a small bar of square cross-section. They are suitably arranged, as shown for example in FIGS. 2 to 4, in such a way in the individual regenerator sections, that the upward flow of the gases on the side lying next to the oven head is favored when the lugs 94 of the grating block 17 are directed downwards and on the side lying next to the center of the oven the downward flow is favored when the lugs 94 of the grating block 17 are directed upwards.

In the center of the individual regenerator sections the grating blocks, however, are arranged with their lugs alternatively upwards and downwards, so that neither of the two directions of flow is particularly favored.

It is, however, also possible to arrange the grating block so that for example all the grating blocks in the regenerator section lying at the head of the oven are built in with lugs directed downwards, so that here the upward flow is favored. The grating blocks in the regenerator section laid in the center of the oven contains lugs pointing upwards, so that here the downward flow is favored. A more centrally placed regenerator section would contain grating blocks wose lugs are pointed alternately upwards and downwards.

It can, of course, also be advantageous to vary the position of the grating blocks in the individual regenerator sections in accordance with a given law, although in the regenerator sections laid in the head of the oven the lugs of the grating blocks are preferably pointed downwards, and in the regenerator sections located in the center of the oven the lugs of the grating blocks are preferably pointed upwards.

With regard to the coking chamber having to be conical, in order to facilitate removal of the coked coke cake, it is advantageous to add to the regenerators located on the ram side from one to three heating flues more than on the regenerators located on the coke side, the regenerator separating wall 15 lying nearly under the heating gas reverse connecting member 30 and the different lengths of these regenerators, as can be seen from FIGS. 9 and 10, are so equalized in width that the grate space of both regenerators is equal in size. In this way the thicker layer of coke on the coke side is heated over a smaller oven length with the same amount of heating gas as the thinner layer of coking coal on the ram side over a correspondingly greater length.

In certain circumstances it may be advantageous to subdivide the regenerators by a longitudinal center wall 95 (FIG. 6) and to be able to supply different quantities of air or lean gas to the two halves may be by throttle valves 90' arranged in the connecting pipes 96 from the waste heat pots 53 to the two sole flues 7. These distribution duties could, of course, also be carried out by valves 81, 83 or 90 which are for example provided.

As already mentioned, the regenerators are sub-divided by vertical partitions 12. This sub-division is all the more advantageous since by this means an oblique flow through the regenerators can, to a large extent, be prevented. In this connection one or more heating flues can be fitted to a regenerator section separated by a vertical partition.

By arranging a longitudinal center wall 95, the expansion joints in the regeneration partitions 12 can be so arranged in the central longitudinal axis of the regenerator that the expansion joints are covered by the joint abutments of the parts of the longitudinal center wall 95. It is of course, also possible to let in the partitions with the expansion joints on one or two sides in the side wall of the regenerator.

In order to prevent a diagonal or cross-flow, it is advisable when arranging the regenerator partitions to insert at the same time shut-off valves 97 in the sliding channel 10 located above the distribution grate 8 between the sole flue 7 and regenerators 11, between the sliding blocks 9 (FIGS. 1 to 4), to thus shut off or sub-divide the slide channels at the regenerator partitions. For this purpose, the slide channel 10 can be higher at its entry in order to render possible the introduction from front to back of the shut-off valve blocks 97 lying against the partitions. The slide channel is accordingly made wider in front than behind.

It still has to be pointed out that the oven block constructed on the foundation block 2 is made with its lower part of fireclay bricks and from the upper part of the regenerators onwards with silica bricks. The foundation block 2 can then be built of bricks or may consist, like the rigid foundation plate 1 of concrete.

It is of special importance for the construction of the oven block that the apertures 29 leading from the connecting member channels 28 into the heating flues 24 are calibrated according to a given law, in order that the heating by flame of the heating flues obtained thereby produces temperatures as uniform as possible in the adjacent coking chambers. The dimensions of the apertures 29 here depend on the normal quantity of heating gas provided for each oven.

In order to avoid leakages in the central connecting member of the heating wall at the flow reversing point, through which the lean gas is able to flow away directly into the waste heat channels lying in the same connecting members, it was advantageous that the two channels present in this central member be supplied alternately only by combustion air and waste gas. According to the present invention it is, however, of advantage to provide no channels in the connecting members 30 lying substantially at the center of the oven or at the flow reversing point and in place of these channels to give the adjacent connecting members on either side two channels each, of which one 28' of normal cross section supplies two adjacent heating flues through calibrated openings located at different levels with lean gas or air, or discharges waste heat through these heating flues, and the other 28'' if requisite with approximately half the cross-section delivers through corresponding calibrated apertures located at different levels lean gas or air only in the heating flues adjacent to the solid central connecting member, or leads waste heat away therefrom.

The same applies to the channels usually provided in the oven heads, which may suitably be discarded, whereby the connecting members lying next to the two oven heads each contain two channels of which one 28' with at least normal cross-section delivers through calibrated apertures lean gas or air into the first and second heating flues or discharges waste heat from them, and the other 28'' with, if requisite, at least half the cross-section only supplies lean gas or air into the head heating system or discharges waste gas from it. It may, however, also be advantageous to make the connecting members located in the middle of the oven or at the flow reversing point, as also the two oven heads, without channels and to provide, in this connection, all the other connecting members with two channels, each, of which one is connected with an air regenerator and the other with a lean gas regenerator or both with a waste gas regenerator each.

As can be seen from FIG. 10, it is particularly advantageous with connecting members having two channels if the heating flues 24 extending from the two channels of a connecting member on both sides of the connecting member 23 preferably proceed obliquely into calibrated apertures 98 provided at different heights, in such a way that the outlet of each two apertures 98 lie at about the same height from the two immediately adjacent connecting member channels, so that the discharging combustion gases mix in turbulent fashion at a favorable distance from the connecting members. In this way it is ensured that the heating gases mixing in the heating flues with the combustion air are also completely burnt.

Particularly with high temperature coking ovens with a short carbonizing period, it has been found to be advantageous to make the outlet cross-section of the calibrated apertures out of the connecting member channels into the heating flues decrease from the bottom towards the top.

Figure 11B:
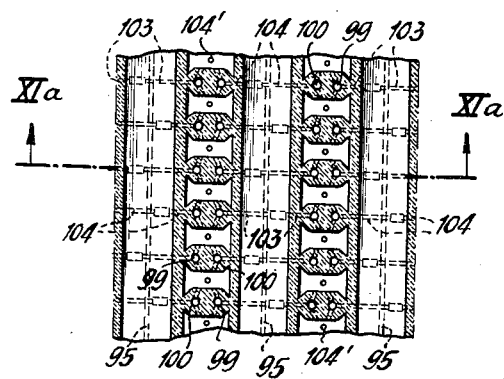

With coal of widely varying properties or for special reasons, such as varying depth of filling in the coking chamber, it may be of special importance to reinforce the heating by the flames of the heating walls now above and now below. In these circumstances, as shown in FIG. 11, two channels 99 and 100 are provided in each of which one supplies only the lower part and the other only the upper part of the appropriate heating flues with gas, in which connection the short channels are connected to the regenerator halves 101 for air or lean gas sub-divided by means of a longitudinal wall 95 and the long channels to the other halves 102 of this regenerator. It is important that the connecting channels 103 are arranged with the short connecting member channels and the connecting channels 104 with the long connecting member channels alternately, in such a way that they do not cut across either each other or the strong gas supply channel 104', and furthermore are so constructed that these connecting channels 103 and 104 are equal in length or have equal resistance to flow in both directions of flow.

Figure 12C:
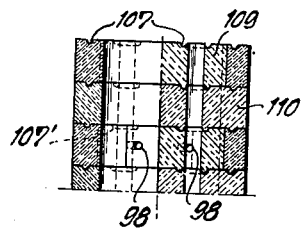
FIGS. 12c and 12d are cross-sectional views taken, respectively, along the lines XIIc—XIIc and XIId—XIId in FIGS. 12a and 12b.
Figure 12D:
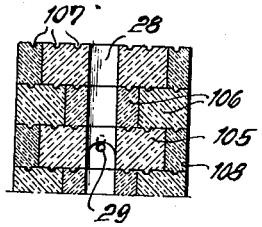
Figure 12A:
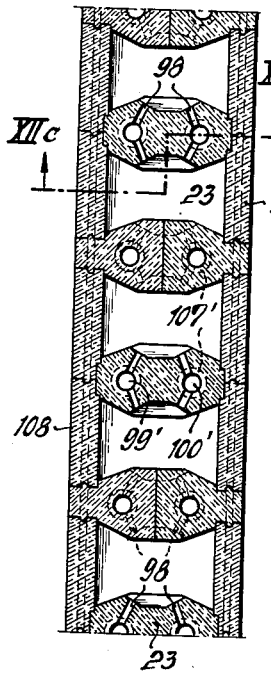
FIGS. 12a and 12b are sectional illustrations of the connections and interlocks between the blocks of two types of heating walls.

With this construction of the coke oven battery it has further been found advantageous to form the masonry connection of the heating wall, as shown in FIG. 12a, by hollow connecting members 23 arranged at center distances of at most 450 mm., which are constructed of multi-part or alternate single-part brick layers 105 and three-part brick layers 106 clamped downwards and upwards by at least 6 groove and tongue joints 107 under them or by the runner stones 108, whereby the masonry volume of the connecting members of a heating wall is kept at least 30% higher than the usual solid header.

Figure 12B:
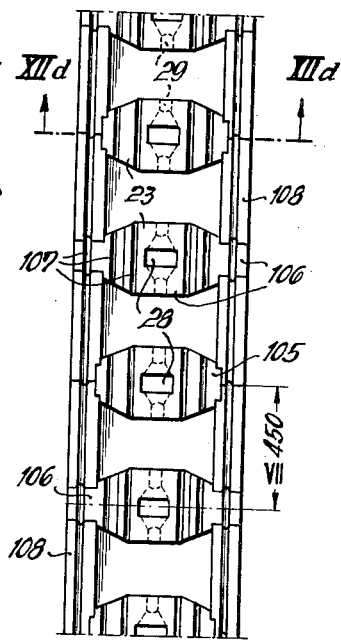

In arranging two channels 99' and 100' in the connecting members 23 as in FIG. 12b, these connecting members are suitably constructed of alternate one-part brick layers 109 and two-part brick layers 110 clamped downwards and upwards by corresponding grooves 107' under them or over the runner stones 108.

As shown in FIG. 13, the horizontal channel 26 located above the heating flues 24 is suitably constructed from three layers of shaped bricks, of which the lower layer 111 and the upper layer 112 are conically reinforced internally and the center layer 113 is made stronger than the normal runner stones 108 of the heating wall, so that the heat supply to the gas collecting space of the coking chamber is relatively small. The pre-calibration of the heating flues 24 at their upper ends is advantageously effected by bricks 114 appropriately reinforced inwards, on whose projection the slider blocks 27 can then be moved for additional adjustment of the heating flue apertures 25.

For increased head heating it is advantageous when using the rich gas supply to build into the horizontal rich gas channel 41 after branching off the branch pipe 116 to the first heating flue a throttle valve 117 of corrosion-and-heat-resistant material which can be operated from the outside.

The calibrated nozzles 42 are suitably arranged at the same height below the floor of the heating flues immediately over the horizontal rich gas channel 41 (FIG. 6). The guard nozzles 43 provided above the calibrated nozzles 42, if requisite with re-calibrated nozzles 44, are arranged at the oven heads at the height of the oven chamber floor and in the succeeding heating flues at a preferably increasing height from 50 to 500 mm. above the oven chamber floor in such a way that overheating of the lower coke cake layers is avoided.

In order to render as safe as possible the alternate operations of reversing the various regenerator groups from rich or lean gas or air to waste gas, it is important that all valve operations succeeding one another in time should be automatically effected by a single mechanically coupled and electrically operated control system of the time switch type. Instead of coupling the whole control system mechanically, it is of course also possible, and under the circumstances incidentally of particular advantage, to effect the whole reversing process hydraulically or pneumatically.

The waste heat pots 53 used in this connection are advantageously formed from immersion bells 55, which, in order to seal the waste heat pipe 56 are immersed in the seal pots 118.

Figure 14:
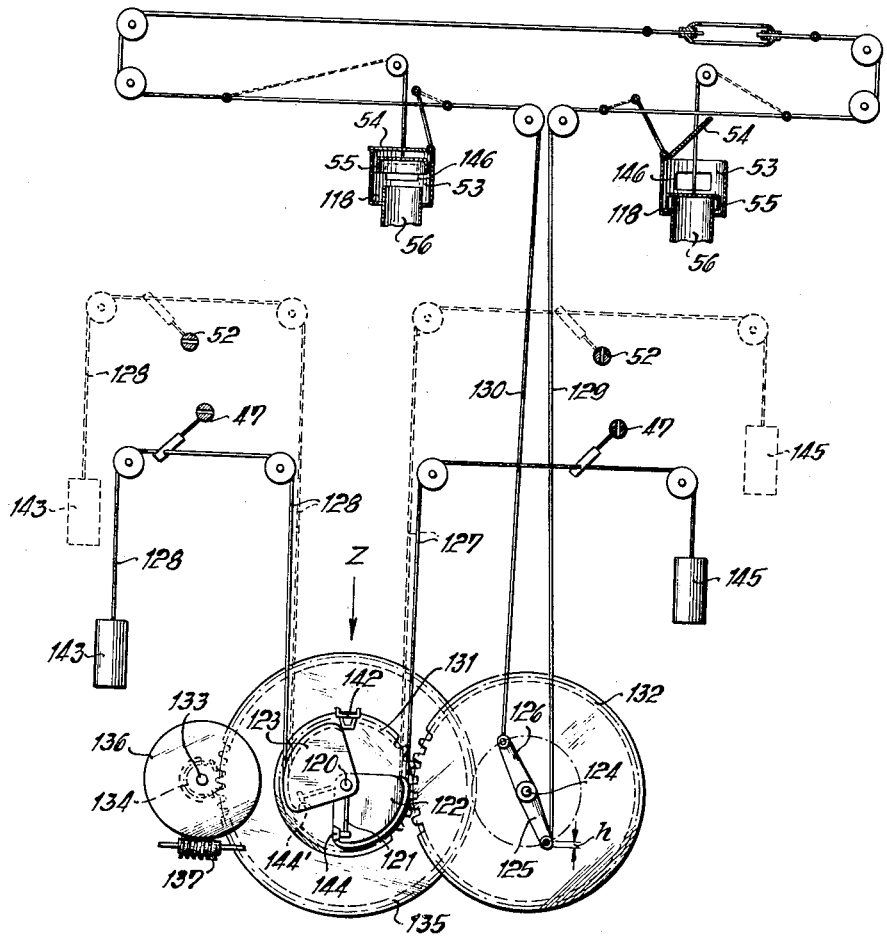
FIG. 14 is a schematic illustration of a mechanical reversing system for the changeover valves of the battery of regenerative coke-ovens.
Figure 14A:
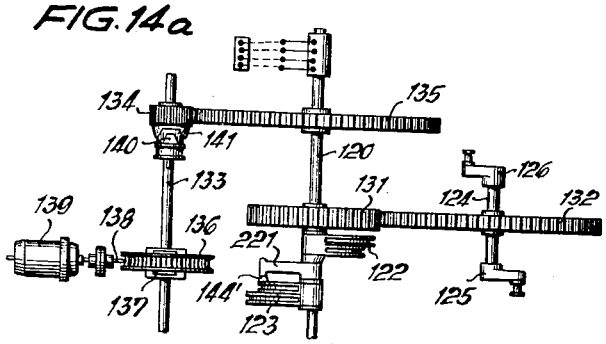
FIG. 14a is a transverse view of the gearing of the system shown in FIG. 14, the view being taken in the direction of the arrow Z.

The mechanically coupled change-over device is constructed, for example, as shown in FIG. 14, by means of rods or tension cables, which are kept under stress by load weights at their free ends, for operating the similarly arranged connected valve. The main drive parts of the machine arranged in front of the oven battery head and from which the change-over process is carried out, are a main shaft 120 with a trailing arm 121 seated rigidly on it, and two loose cable pulley segments 122 and 123 rotatable around it together with a second main shaft 124 with two diametrically opposed cranks 125 and 126 seated rigidly on it. The cable pulley segments 122 and 123 ensure by means of the tension ropes 127 and 128 fixed to them the reversal of the rich and lean gas cocks 47 and 52. As shown the two tension ropes 127 and 128 are respectively fixed to the rope pulley segments 122 and 123, one of said tension ropes controlling the rich gas cocks (shown in solid line) and the other the lean gas cocks (shown in dotted line). By means of the additional shut-off valves 48 or 51 fitted to the individual ovens, which suitably lock reciprocally, it is ensured that the individual ovens can advantageously be fed either with rich gas only or with lean gas only. The cranks 125 and 126 effect, by means of the tension ropes 129 and 130 articulated to them, the change-over of the air valves 54 and the waste gas immersion bells 55.

In this connection there is a given ratio between the shafts 120 and 124, inasmuch as the number of teeth of the gearwheels 131 and 132 fixed on it are in a certain relation to one another, such as for example 5:8, that is to say while the shaft 120 at any revolution makes each time a complete rotation of 360°, the shaft 124 runs through an arc of a circle only ⅝ of the circumference, that is 225°. The shaft 120 receives its drive from a shaft 133 through a gearwheel pinion 134 and large gearwheel 135. On the shaft 133 is rigidly seated the wormwheel 136, in which meshes the worm 137 on the shaft 138 of an electric motor 139. This worm drive is self-locking during the stoppage of the motor, that is to say, it can only be driven by the motor and cannot set the motor in backwards rotation during reversed drive. On the shaft 133 is movably seated the claw clutch 140, whose teeth mesh in the corresponding claw component 141 of the gearwheel 134 which is loosely rotatable on the shaft 133. The engagement and release of this clutch are effected by the gas deficiency safety device which will be described later. The reversing device is found in the position where a left rope pulley segment 123 is laid round it in its uppermost position, whereby it rests against the fixed stop 142 of the machine frame and the tension rope 128 fixed to the segment 123 under the effect of a dropped weight 143 fitted to its free end and keeps closed the left hand gas cock 47 or 52. The other right hand rope pulley segment 122 is held on the projection 144 by the trailing arm 121 of the shaft 120 in its lowest position, whereby the tension rope 127 connected with the segment 122 under tension by the weight 145 keeps open the right hand gas cocks 47 or 52.

This weight 145 is then lifted high accordingly at its free end. The cranks 125 and 126 of the shaft 124 hold the air valves 54 on the right hand side of the oven open and the waste gas immersion bell 55 on the right hand side of the oven closed by means of the tension ropes 129, 130 running round the oven battery, while the air valves 54 on the left hand oven side are closed and the waste gas immersion bell 55 on the left hand oven side are opened. Fuel gas can also be supplied on the right hand side through the cocks 47 or 52, combustion air through the open valves 54 of the corresponding reversing pots 53 or lean gas through the connecting pipe 146 all to right hand regenerators, while on the left hand oven side the waste gas immersion bells 55 are open, so that waste gas can flow out of all the regenerators there via the connecting pipes 146 through the waste gas outlet 56 to the waste gas channels 3 on each side of the oven leading to the chimney. In the change-over process, the shaft 120 and with it the trailing arm 121 revolves anti-clockwise out of the indicated operating position, so that next the segment 122 comes against the stop 142 on the machine frame. While this is going on the cranks 125 and 126 travel through an angle of 45° clockwise. During this crank travel the traction ropes 129 and 130 remain to a large extent at rest in their position, since the arcs traversed by their end pivots, which arcs stand transversally to the main direction of these traction ropes, are only of a trifling height $h$.

With further movement of the machine the cranks 125 and 126 travel through an arc of 135°, whose chord runs parallel to the main direction of the traction ropes 129 and 130. In this connection the air valves 54 and the waste gas bells 55 are set in their opposed position. The trailer arm 121 is meanwhile rotating idly with the shaft 120. While the cranks 125 and 126 now travel through their last arcs, during which their traction ropes 129 and 130 continue to remain practically inactive, the trailer arm 121 travels through an arc as far as the stop 144′ on the segment 123 and on with the segment to its original position, and thus turns the left hand rope pulley segment 123 round to its lowest position, thus opening with its traction rope 128 the left hand gas cocks 47 or 52 and correspondingly lifitng up the weight 143.

The gas deficiency safety device combined with the above described change-over device will now be described as shown for example constructed in accordance with FIG. 15. To move the clutch 140 in and out the perpendicular arm 147 of a lever is used, which swings round the pivot 148 rigidly seated on the machine base, and on the opposite side has a nearly horizontal arm 149 sloped slightly downwards. Round the same pivot swings a horizontal drop lever 150 which is loaded with a weight 151 and is held freely suspended in its upper position by a pawl 152 which engages under a snug 153 rigidly attached to the lever 150. This pawl 152 is able to swing round the pivot 154 fixed on the machine frame, and the horizontal arm 155 is rigidly connected with it.

One of the eye lugs 156 projecting from the lever arm 149 grips round the drop lever 150 lying below in its position shown in FIG. 15, so that thereby the arm 147 is held in the position shown, in which case the clutch 140 is moved in. When the pawl 152 is brought round out of the position locking the drop lever 150 by rotation round its pivot 154, the lever 150 drops on the end knob 157 of the lever arm 149, thereby striking this and the lever arm 147 connected with it round so that the clutch 140 with its teeth is released from the jaws 141 and thereby moved out.

The above mentioned ejection of the pawl 152 is now effected by the device shown on the left hand side of FIG. 15. On the box-like underframe 158 is supported a tubular perpendicular column 159.

The head of this column supports the housing 160, in which is fixed a horizontal resilient diaphragm gas-tight upwards. Above the housing 160 is located the head 163, connected by the connecting pipes 162, in which head are fitted suitable control and shut-off devices, and in which the gas pipe 164 opens.

This gas pipe 164 is connected to the supply pipe for fuel gas in the oven installation and thus transmits the pressure to the control diaphragm 161.

The gas pressure loading this diaphragm downwards is maintained by means of the central spindle of a double-arm weight-loaded lever 167 swinging round the fixed pivot 166 in equilibrium.

In this equilibrium position a wedge-shaped head 168 at the lower end of the spindle 165 holds the two suspended swinging levers 169 so forced apart that their lower ends hold fast a heavy dropping weight 170.

In the underframe 158 is arranged a horizontal lever 171 rotatable round the fixed pivot 172, from which a perpendicular extension 173 projects up freely into the middle of the column 159.

At the free end 174 of the lever 171 is fixed the traction rope 175, which leads over fixed rollers 176 and is articulately connected by its other free end to the end of the lever 155.

When a reduction in pressure fuel gas begins in the pipeline 164, the diaphragm 161 is correspondingly released from pressure, so that the loading lever 167 presses the spindle 165 upwards. The wedge head 168 at the lower end of the spindle is thereby raised to such a high position that the two swinging levers 169 are able to move together and thus release the drop-weight 170. This weight falls through the tubular column 159 on the extension 173 of the lever 171, presses this down by the power of the fall and by means of the traction rope 175 lifts up the lever 155, whereby the pawl 152 rigidly connected with the latter is pushed out under the snug 153 of the drop lever 150 and thus out of the locking position. The lever 150 can then drop under the action of the loading weight 151, thereby pressing the lever arm 149 down and moving the lever arm 147 round, so that the clutch 140 is moved out. As the gearwheel pinion 134 is now free to rotate on the shaft 133, the trailer arm 121 of the rope pulley segment 122 can no longer be held against the pull of the traction rope 127 and the loading weight 145 suspended from it. The segment is, therefore, turned round as the weight 145 sinks, whereby the right hand side gas cocks 47 or 52 are closed. In this way the whole oven battery is shut-off from the fuel gas supply and the danger of explosion due to a temporary gas deficiency and any possible subsequent restoration of the gas supply is consequently averted.

By the rotation indicated of the trailing arm 121 for the rope pulley segment 122 and hence of the shaft 120 the shaft 124, by the engagement of the gear wheels 131 and 132 is also rotated a little further, namely to such an extent that the cranks 125 and 126 complete an arc of travel of 45°; this, however as stated above, has practically no effect on the attached traction ropes 129 and 130. It also occurs, if and so long as the gas safety device is working, that apart from the closure of the gas cocks up till then standing open, no further change-over process takes place. With combinations of the above described gas deficiency safety device with the mechanical reversing device already described, it is also advantageous to allow the arc of travel of the two cranks 125 and 126 travelled back during the whole reversing process not to comprise more than half a circle, whereby the chord of the arc lies parallel to the main direction of the attached traction ropes 129 and 130.

Instead of the mechanical reversing device under certain circumstances it can be specially advantageous to carry out the alternate reversing of the various regenerator groups from rich or lean gas or air on the one hand to waste gas on the other hand by a single hydraulically or pneumatically coupled, electrically operated time switch type control system automatically.

The device shown in FIG. 16 is used for this, as will now be explained in further detail.

In this figure M is supposed to be the machine side and K the coke side of a coke oven battery. As before 47 or 52 indicate the gas cocks of the individual ovens present on the two sides of the oven and 53 the waste heat pots fitted on both sides of each oven together with the air valves 54 and the waste heat immersion bells 55.

Out of the reclaiming tank 180 flows the operational liquid to the electric pumps 181 and at their outlet to a foot pump 182 connected in parallel and from there via nonreturn valves 183 to a pressure liquid feed 184. From here a pressure pipeline leads to the switch device 186 serving as a control apparatus, which independently controls, maintaining the intermediate pauses, the reversing valves, via the individual pressure cylinders 187 to 190 (servo-motors) or the connecting pipes 191, 192, 193 and 194 leading to them. In this connection there is provided both for the rich gas cocks 47 and also for the lean gas cocks 52 an operating cylinder each, 187 or 188, which meanwhile are switched in parallel. Care is also taken, by means of the shut-off valves 48 or 51 fitted to the individual ovens, that the individual ovens can only be supplied, advantageously group-wise, either with rich gas or lean gas.

Naturally it is, of course, basically possible to connect the rich gas cocks 47 and the lean gas cocks 52 to a common operating cylinder.

For the sake of safety, at the pressure liquid feed 184 another return pipe 195 to the reclaiming tank 180 is provided. The control apparatus 186 is provided with a handwheel 196, through which the change-over process is initiated, preferably by hand, upon which it is carried out by the motor 197. In the course of this change-over process the working cylinders which receive the pressure liquid, are utilized for reversing the gas cocks and valves under their own working power. The other cylinders, which are subjected to pressure, allow the liquid to flow back to the reclaiming tank 180. At the end of this condition of affairs a cycle, that is the whole reversing process, is concluded. In order to ensure, should there occur a breakdown in operation of the hydraulic change-over device, the further working of the same, between the control 186 and its driving motor is fitted a clutch which can be moved out or a freewheel device 198, by which means the drive of the control can be switched over to hand operation.

The gas deficiency safety device according to FIG. 15 is thereby coupled with this installation in such a way that the traction rope 175 if requisite engages via corresponding leading pulleys 176 the corresponding levers 199 of the three-way cocks 200 in the pressure means pipelines 192 and 193. The cock located in the pipe 192 is drawn in FIG. 16 in its normal position, while the three-way cock fitted in the pipe 193 is drawn in the closed position replaced by the gas deficiency safety device. The traction rope 175 is here shown in dotted line, as is the drop lever 171. In this position the pressure liquid is pressed out of the working cylinder 188 of the gas cocks 47 or 52 via the pipe 193 and the corresponding three-way cock 200 by the dropweight 201 fitted thereto, into the reclaiming tank 180, and thereby the gas cocks 47 or 52 on the machine side M, which hang on the rods 202, are closed. Simultaneously the gas cocks 47 or 52 on the coke side K are likewise closed, as through this process the working cylinder 187 is not affected. So long as the pressure in the main gas pipe of the oven heating system is maintained normally upright both working cylinders 187 and 188 are connected with the control apparatus 186, through which alone they are actuated.

The use of transformer oil as a pressure liquid is satisfactory particularly as in the main processes and at the battery head no great variations in temperature are encountered. The pressure liquid feed 184 is preferably of such a size that when completely filled at least 3 reversals can be effected without further pumping. The capacity of the electric pump 181 is such that it can fill the whole pressure supply container in a reversing period, that is with the given embodiment only at most over a third of the reversing period need be brought into operation. The pressure agent feed consists suitably of a fixed pipe 203 with a vertical axis and pressure agent connecting pipes 204 and 205 above the lower floor 206 and also a correspondingly weight-loaded cylinder 207, which can be moved pressure-tight through the stationary pipe 203 as a piston and on reaching its lower or upper final position actuates electric contacts which switch on or off the pressure agent pumps 181.

Figure 17A:
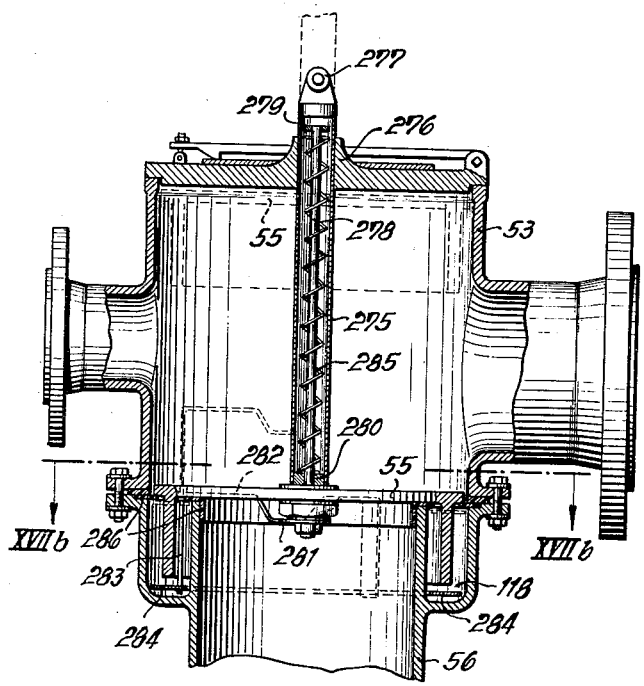
FIG. 17a is a partly sectional illustration of a waste heat pot with a liquid-immersible bell-type seal.
Figure 17B:
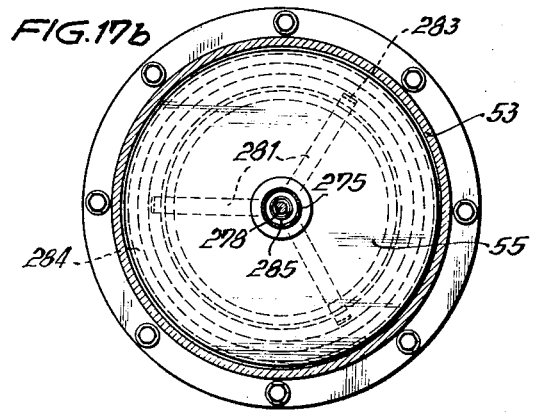

Of special advantage furthermore, is the construction of the waste heat pots 53 with immersion bells 55, which engage in seal pots 118 in the following manner, as shown in FIGS. 17a and 17b. The spindle fixed to the immersion bells 55 consists of a pipe 275, that at 276, leads out of the cover of the waste heat pot and is provided with an eye lug 277, which engages the central control device.

Inside the pipe 275 is located a movable spindle 278, which is closed at its upper end by the spring cap 279, which simultaneously ensures a suitable guidance inside the pipe 275. At the immersion bell is arranged a corresponding guide 280 for the spindle 278. At the lower end of the spindle 278 are fixed three flat bars 281, which lie in the grooves 282 of the immersion bell 55 and carry at their vertical ends 283 an annular plate 284, which is located in the seal pot below when the immersion bells are closed. Between the spindle 278 and the pipe 275 is further arranged a spiral 285.

In the closed condition the immersion bell 55 lies on the joint ring strip 286, from above, while in the open condition the annular plate 284 is applied from below against the annular strip 286 and thus shuts off the seal pot space filled with the liquid from the hot gases. The annular plate 284 is here pressed by the spring 285 via the spindle 278, the flat bars 281/283 upwards. The losses of liquid when the immersion bells are opened and the corrosion stresses of the seal pots are by this means avoided to the greatest extent.

In order to obtain as efficient as possible a utilization of the heat given out by the heating gas it is advantageous to be able to release the automatic reversing or a signal serving for this purpose at a temperature of the waste gas, for example 250° C. in the flue gas channel, which must not be exceeded, by means of a suitable relay, in which connection, however, a suitable time switch ensures the change-over signal or the change-over itself in good time, in case the waste gas temperature relay fails to act.

To enhance safety in operation during the change-over in the compound coke oven from rich gas to lean gas heating, it is also of considerable importance that the operating members for the shut-off cocks fitted to the separate ovens for rich gas or lean gas, are interlocked in such a way that on each occasion the opening of the lean gas cocks is a pre-requisite of the closing of the rich gas cocks and vice-versa.

In accordance with the invention it has also been found advantageous to arrange a multiplicity of flue gas channels parallel to the longitudinal axis of the battery on the foundation plate below the refractory blocks uniformly distributed.

By this means the foundation block is brought to a uniform temperature, not too high, so that the danger of cracks occurring is reduced to a minimum. At the same time a considerable saving of space is achieved.

The flue gas channels can all be interconnected and connected with a common chimney. It is, however, also possible, as shown in FIGS. 1 and 18, that in each case half the flue gas channels are interconnected and alternately serve to lead off the flue gas, in which connection all the flue gas channels are likewise connected to a common chimney.

To increase the operational safety and also to obtain the utmost possible utilization of the heating gas it is important that during the change-over of a regenerator group from lean gas to waste gas, the lean gas supply is first cut off, after which flue gases or other inert gases are blown in the regenerator until any lean gas still in the regenerator is expelled and pressed into the heating spaces, where it meets with the further air pouring in for combustion and only after that with reversal of the direction of current of the waste gas chimney with the regenerators already supplied with lean gas and air and on the other hand the air supply pipes and—maybe after a short pause—the lean gas supply pipes are connected with the regenerators hitherto supplied with waste gas.

It is, of course, expedient in this connection to allow the inert gas purging of the regenerator groups previously supplied with lean gas to be actuated by the automatically acting change-over device of the change-over valves. For this purpose a device is used in accordance with FIGS. 18a and 18b. According to these the flue gases arrive through one of the two series of the channels 3, each series interconnected by cross-channels 5, via the connecting channels 208 or 209 into a common kick channel 210, which can be shut off from channels 208 or 209 respectively by a change-over gate valve 211. Out of the duct 210 the ventilator fan 212 sucks the waste gas and conveys it into the flue gas reservoir 213. From this flue gas reservoir 213 two distribution pipes 214 are connected to both sides of the battery. The branch pipes 215 here lead via a valve 216 to the waste heat pots 53 for the regenerators supplied with lean gas.

Figure 18A:
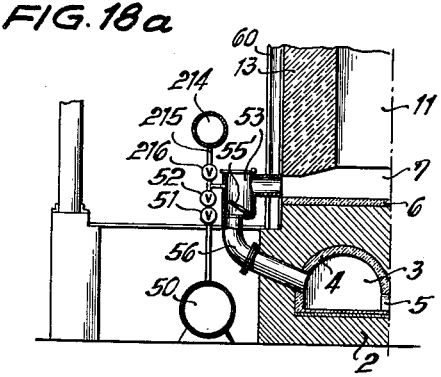
FIGS. 18a and 18b show diagrammatically the inert gas washing of the regenerators upon reversal of the flow, as well as a device for sealing the waste heat valves by flue gas counter pressure.
Figure 18B:
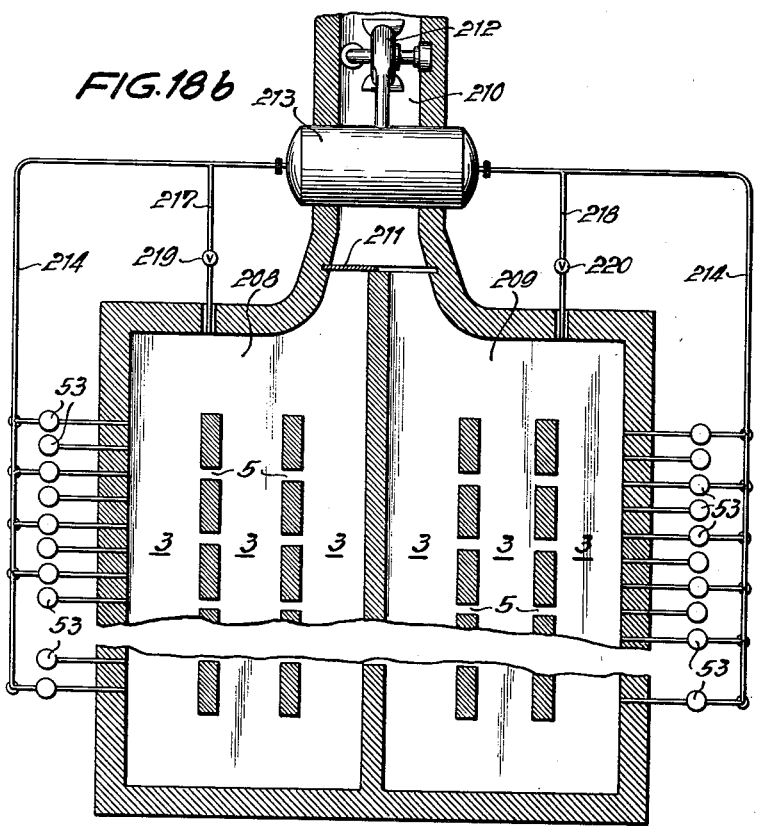

As shown in FIG. 18a, the waste heat pots 53 can also be fitted with suitable waste heat valves 55' instead of with immersion bells 55.

In this case it is, however, particularly desirable, among other things, to avoid lean gas overflow losses due to the valves 55' in the flue gas channel 3 not being completely airtight, which is generally the case, during the lean gas supply to the regenerators to keep the flue gas channels 3 connected with these by the valves 55' at a suitable position of the change-over gate valve 211 by means of the branch pipes 217 or 218 and the change-over valves 219 and 220 under a pressure which definitely corresponds to the lean gas pressure in the waste heat pots 53. In this connection a suitable overpressure safety device can be fitted to the change-over gate valve 211.

Such a measure can also be adopted under certain circumstances with advantage, when immersion bells 55 are provided in the waste heat pots 53. When the immersion bells are lifted up by equalizing the pressure above and below the bells losses of the immersion fluid are avoided.

The flue gas or inert gas purging of the regenerators previously supplied with lean gas can, instead of via the general distribution pipe 214 with the branch pipes 215 and change-over valves 216, be advantageously effected via the branch pipes 217 and 218 and the change-over valves 219 and 220 via the flue gas channels 208 or 209 and 3, direct.

In this case the flue gas channels 3 located under the regenerators supplied with lean gas or air are placed, with closed change-over valves 211 and open change-over valves 219, under a pressure which corresponds approximately to the lean gas pressure in the waste heat pots 53. If also, when the regenerators are changed over, the lean gas cocks are closed and then the waste heat flap valves 55' opened, then the flue gas occurring in the flue gas channels 3 is automatically purged back out of the regenerators, so that after a short pause the change-over valve 219 can be closed and the change-over gate valve 211 opened or displaced to the other flue gas side. By this means the direction of flow is reversed, and a corresponding process repeated on the other regenerator side.

With most coking installations account must be taken of the fact that because of variations in the coke market or for other reasons work has to be carried out with different carbonization periods. The shortest possible carbonization times or the highest heating wall temperatures, for which modern coke oven installations are dimensioned, therefore can very often not be used.

Figure 19:
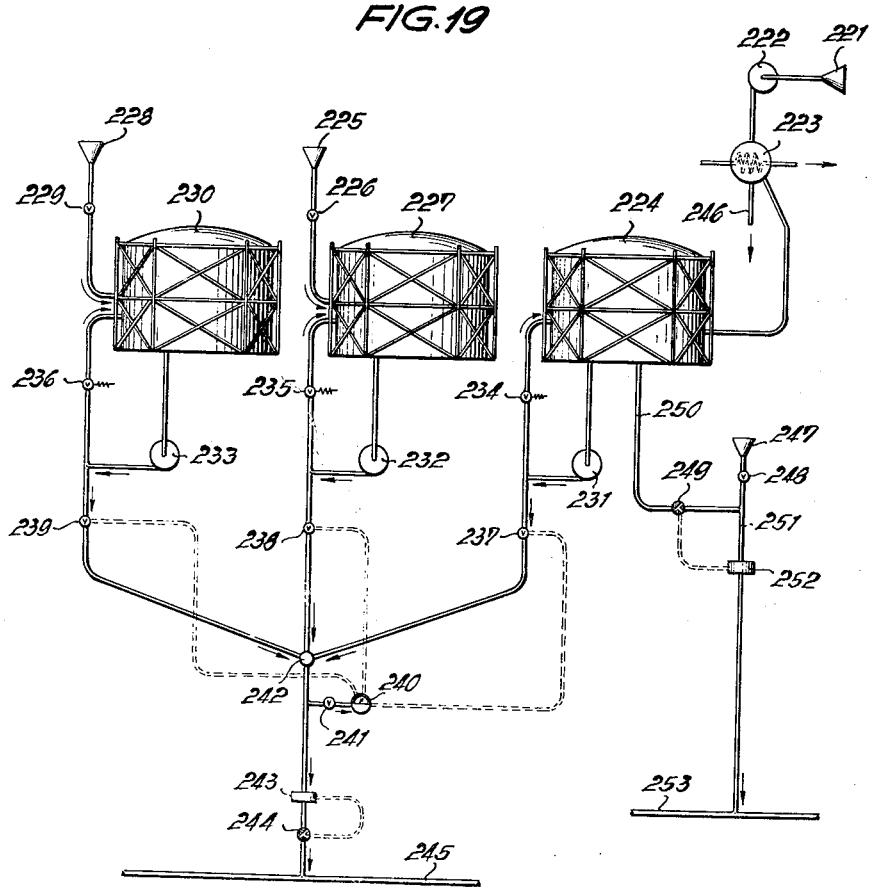
FIG. 19 is a diagrammatic illustration of a gas mixing system.

It happens frequently that the necessity occurs of reducing the heating wall temperature in order to obtain longer carbonization times. Here the amounts of heating gas or combustion air must be reduced. Under these circumstances the gas distribution set for the maximum charging capacity becomes faulty. This means that the gas distribution to the whole heating wall becomes more unfavorable in inverse proportion to the quantity of heating gas which has to be supplied. A special embodiment of the present invention now establishes that this disadvantage can be completely overcome. By this means, the quantity of heating gas supplied to the coke oven battery is kept definitely constant and its calorific value is adjusted by diluting rich gas with lean gas or flue gas, or lean gas with flue gas, or rich gas with lean gas with flue gas. The device used for carrying out this process is shown, by way of example, in FIG. 19.

At 221 flue gas is sucked off from the flue gas channel by means of a ventilator fan 222 and compressed over a condenser 223 in the gas-holder 224. At 225 lean gas arrives via the valve 226 in the gas-holder 227.

At 228 rich gas pours through the valve 229 into the gas-holder 230. From each of the gas-holders 224, 227 and 230 gas is drawn in through the blower 231, 232 or 233 and returned via the overflow pressure regulators 234, 235 or 236 into the appropriate gas-holder in the cycle. A part of this quantity of gas is drawn off out of the pressure piping and quantitatively regulated through the regulating valves 237, 238 or 239, which draw their impulse from a heating value regulator 240 which is connected via a valve 241 to the gas collecting pipe after the mixing point 242. In the gas collecting pipe is located another diaphragm plate 243, whose resistance to current is kept constant by means of the regulating valve 244 connected with it. The gas mixture so regulated then arrives in the main collecting pipe 245 to the coke oven battery. With the device represented any type of gas mixture is possible. If care is taken that a constant gas pressure is maintained in the suction pipes of the blowers 231, 232 or 233, then the gas-holders 224, 227 or 230 can also be discarded. Of course, only so much blast and accessories are required as is necessitated by the quantity of gas to be mixed.

The flue gases are suitably cooled in the condenser 223 to such a degree that in the succeeding devices the temperature of this flue gas is no longer below its condensation point, thus corrosion cannot occur. In this connection the condenser 223 is made of corrosion-resistant material. The condensate separated off in the condenser 223 is led off through the pipe 246.

It is possible in the manner described to obtain any desired heating wall temperature and hence any carbonization time with nearly equal quantities of heating gas, and hence with the optimum gas distribution on the heating walls.

In particular with rich gas heating, but also with very long carbonization times with lean gas heating, it may also be of importance to dilute the combustion air with flue gases, in order to be able to distribute them better on the whole heating walls with approximately constant charging volume. In this connection a process can be effected for example in accordance with FIG. 19, that to the combustion air entering at 247 into the heating system, which air can be adjusted by the throttle valve 248, by the regulating valve 249, which is built in an additional branch pipe 250 of the flue gas-holder 224, such a quantity of flue gas is added that the flow resistance of the air-flue gas mixture in the collecting pipe 251, measured through the measuring apertures 252 is kept at the optimum adjustable value.

The air-flue gas mixture then arrives through the main collecting pipe 253 to the individual waste heat pots 53 to which combustion air is to be supplied. The air valves 54 fitted to these then alternately open and shut the connection with the main collecting pipe 253.

Finally, three further embodiments of the central support of the buckstays 60 may advantageously be considered, which are further described in what follows in connection with FIGS. 20, 21 and 22.

The lattice girder 66 extending over the whole length of the battery supports the buckstays 60 via the compression springs 65 and is rigidly connected with a multiplicity of semi-portal supports 255. The upper end of each semi-portal support 255, which lies by the buckstays 60, is anchored at 256 by vertical tie rods 257 in the foundation 1. The foot of each semi-portal support 255 rests by means of roller bearings on the extended foundation plate. The horizontal tension of the foot of each semi-portal support 255 is taken up by tie rods 259, which go transversally through the battery at the base plate 1 or the foundation block 2 and are adjustably fixed to the foundation.

These tie rods 259 are articulated to the feet of the semi-portal supports 255 by means of connecting members 260 and adjusted to the requisite length by a turnbuckle 261. The side wall of the main passage 264 is connected to the semi-portal supports 255. The floor 74 of the main passage is anchored via suitable cross-girders at 262 to the buckstays 60 and at 263 to the semi-portal supports 255. The floor 74 of the main passage is anchored via suitable cross-girders at 262 to the buckstays 60 and at 263 to the semi-portal supports 255. The main passage roof 73 lies on the lattice girders 66.

In FIG. 21 a further embodiment of the buckstay arrangement according to the invention is shown. The semi-portal support 266 here shortened as compared with FIG. 20 rests on the transversally extended foundation plate 1, raised upwards over the flue gas channels, by means of roller bearings 265. The upper ends of the supports 266 are stayed as in FIG. 20 by vertical tie rods 257 to the foundation plate 1, while the horizontal forces acting on the foot of the semi-portal support 266, as in FIG. 1 are taken up by the tie rods 63 passing transversally through the battery, which are adjustably fixed at 64 to the buckstays. Here again connecting members 70 and turn-buckles 71 are provided. The side wall 267 of the main passage, which side wall only begins above the raised foundation plate 1, is here likewise connected to the semi-portal supports 266. The other details are in agreement with FIG. 1 or 20.

In FIG. 22, finally, a form of embodiment is described in which the lattice girders 66 are held firm by a multiplicity of rigid angle supports 268. The lattice girder 68 is thereby connected by the articulation 269 with the vertical arms of the angle supports 268, while on the buckstay side, it is held by brackets 67. The angular corners of the angle support 268 thereby rest as in FIG. 21 on the transversally extended, and raised up above the flue gas channels, foundation 1 by means of roller bearings 265. The horizontal arms of the angle supports 268 support the floor 74 of the main passage and are stayed at their ends lying below the buckstays on the one side by vertical tie rods 271 in the foundation 1 and on the other side—maybe by means of the buckstays 60—are held fast by horizontal tie rods 272 going transversally through the battery and adjustably fixed to the buckstays. The transmission of the horizontal forces of the horizontal arm of the angle support 268 to the buckstays is effected by the suitable angle iron 273. The other details are in accordance with FIGS. 1 and 21.

It can thus be seen that there has been provided in accordance with the invention regenerator means 11 which are divided by partition walls so that adjacent generator sections are created, which communicate with associate heating flues, located above said generator means. Each generator section is provided with a checkerwork having spaced elements supporting therebetween respective upwardly and downwardly directed lug-shaped projections, so that upward flow of gaseous medium is facilitated by downwardly directed projections, whereas downward flow of gaseous medium is facilitated by upwardly directed projections. Below the regenerator sections are disposed slide blocks which are slidably supported on grate means. Some of the slide blocks are provided with locking means located adjacent said partition walls of said regenerator sections for preventing crosswise flow of said medium in and for laterally sealing said regenerator sections. According to the preferred embodiment of the invention, adjacent grate means with the slide blocks in contact thereon define therebetween corresponding grate slots and slideblock slots, said slide block slots being dimensioned and shaped, so that passage therethrough of said medium into corresponding regenerator sections is gradually increased toward the region near the center wall, said grate slots as viewed in the direction from said oven heads toward the region near the center wall and close to said sole flue channel means presenting gradually narrower openings, so that substantially equal and uniform distribution of said medium between said sole flue channel means, said regenerator means and said heating flues is afforded and substantially even heat treatment of the walls of the coke chamber means is effectuated.

Various changes and modifications may be made without departing from the spirit and scope of the present invention and it is intended that such obvious changes and modifications be embraced by the annexed claims.

Having thus described the invention, what is claimed as new and desired to be secured by Letters Patent is:

1. In a regenerator compound coke oven battery having a center wall and a plurality of oven heads in opposed relation to said wall, horizontal upper flue channel means located at a predetermined level above said center wall, horizontal sole flue channel means extending toward said center wall and adapted to admit and direct a gaseous medium under pressure toward said center wall from the side at which the respective oven heads are disposed, upright walls defining coke chamber means, heating flues defined by spaced apart binder means having ducts for guiding into respective heating flues said medium which is adapted to be burnt therein and to transfer heat to said upright walls of said coke chamber means for coking the contents of the latter, said binder means and said upright walls extending between said upper flue channel means and a level determined by the upper end of said center wall and being arranged at either side of said center wall for use in reversible oven operations, the upper ends of said binder means defining therebetween openings adapted to communicate with said upper flue channel means, and with checkerwork equipped regenerator means located below said heating flues and coke chamber means and above said sole flue channel means, with which said regenerator means are in communication by way of means for regulating the flow of gaseous medium into and out of said regenerator means, respectively, during said reversible operations;

the improvement comprising:

(a) each of said regenerator means being provided with a vertical partition wall dividing each regenerator means into adjacent regenerator sections, respective regenerator sections being provided with means establishing connection to associated heating flues, (b) said checkerwork of each regenerator section being provided with spaced elements supporting therebetween respective upwardly and downwardly directed lug-shaped projections, so that upward flow of gaseous medium is facilitated by downwardly directed projections, whereas downward flow of gaseous medium is facilitated by upwardly directed projections, (c) said regulating means being provided with fixedly disposed distributing grate means and slide blocks supported thereon and extending between said grate means and the checkerwork of each regenerator section, and (d) locking means provided on predetermined slide blocks located adjacent said partition walls of said regenerator sections for preventing crosswise flow of said medium in and for laterally sealing said regenerator sections, (e) adjacent grate means with said slide blocks in contact thereon defining therebetween corresponding grate slots and slide block slots, said slide block slots being dimensioned and shaped, so that passage therethrough of said medium into corresponding regenerator sections is gradually increased toward the region near the center wall, said grate slots as viewed in the direction from said oven heads toward the region near the center wall and close to said sole flue channel means presenting gradually narrower openings, so that substantially equal and uniform distribution of said medium between said sole flue channel means, said regenerator means and said heating flues is afforded and substantially even heat treatment of the walls of the coke chamber means is effectuated.

2. In an oven according to claim 1, including one solid binder means located intermediate said heating flues and extending directly from the upper end of said center wall, said one solid binder means being devoid of ducts, so that reversal of flow of said medium from upward direction to downward direction is uninfluenced by said one solid binder means, binder means located at each side of said one binder means being each provided with two duct means spaced from each other for discharge of said medium therefrom.

3. In an oven according to claim 1, said checkerwork including checker elements substantially of a shape, so that the flow of the gaseous medium in upward direction is about equal to that in downward direction in the median region of each regenerator section.

4. In an oven according to claim 1, said sole flue channel means having a forward end at the oven head side and a rearward end adjacent the center wall, the lug-shaped projections of said checkerwork in said regenerator means being disposed relative to said elements, so that the flow of gaseous medium in downward direction in said regenerator means encounters a greater flow resistance adjacent the forward end of the respective sole flue channel means than adjacent the rearward end of the latter.

5. In an oven for operation with a gaseous medium in the form of rich gas according to claim 1; including nozzle means in communication with said heating flues for admitting said gas to said heating flues, intermediate horizontal channel means for supplying rich gas and extending at a level between said regenerator means and said heating flues, said nozzle means being provided with calibrated openings for regulating the supply of rich gas from said intermediate horizontal channel means to said heating flues, respectively.

6. In an oven according to claim 1, the base portion of the elements and of the projections of said checkerwork in said regenerator means being of substantially square cross-section and of a length commensurate with the width of said regenerator sections, the upper ends of said lug-like projections being arcuate in shape and extending beyond the height of said elements.

7. In an oven according to claim 1, said coke chamber means terminating in a forward end, and further horizontal channel means arranged between said regenerator means and said heating flues for permitting additional gaseous medium to be supplied from below to at least one of said heating flues located adjacent said forward end of said coke chamber means.

8. In an oven according to claim 7, said further horizontal channel means being connected to said regenerator means situated therebelow by an aperture located at the side of the oven heads, the cross-section of said aperture being variable by regulatable means arranged for actuation from without said further horizontal channel means.

9. In an oven according to claim 7, including throttle valve means of corrosion- and heat-resistant material arranged for regulating the passage of said additional gaseous medium in said further horizontal channel means, said throttle valve means being operable from without said further horizontal channel means.

References Cited in the file of this patent

UNITED STATES PATENTS

| | | |
|---|---|---|
| 673,928 | Schniewind | May 14, 1901 |
| 1,055,536 | Hughes | Mar. 11, 1913 |
| 1,093,895 | Tschudy | Apr. 21, 1914 |
| 1,296,746 | Bodmer | Mar. 11, 1919 |
| 1,567,537 | Mockus | Dec. 29, 1925 |
| 1,686,826 | Loftus | Oct. 9, 1928 |
| 1,876,108 | Van Ackeren | Sept. 6, 1932 |

(Other references on following page)

UNITED STATES PATENTS

| | | |
|---|---|---|
| 1,967,975 | Schaefer | July 24, 1934 |
| 2,100,762 | Becker | Nov. 20, 1937 |
| 2,102,608 | Becker | Dec. 21, 1937 |
| 2,110,376 | Drehschmidt | Mar. 8, 1938 |
| 2,334,612 | Davis | Nov. 16, 1943 |
| 2,467,166 | Thorpe | Apr. 12, 1949 |
| 2,554,818 | Davis | May 29, 1951 |
| 2,672,437 | Otto | Mar. 16, 1954 |
| 2,710,281 | Weissenborn | June 7, 1955 |
| 2,737,481 | Kolks | Mar. 6, 1956 |
| 2,746,914 | Van Ackeren | May 22, 1956 |
| 2,789,086 | Schurhoff et al. | Apr. 16, 1957 |
| 2,804,428 | Van Ackeren | Aug. 27, 1957 |
| 2,821,504 | Doll | Jan. 28, 1958 |

FOREIGN PATENTS

| | | |
|---|---|---|
| 360,956 | Great Britain | Nov. 11, 1931 |
| 407,716 | Great Britain | Mar. 20, 1934 |
| 490,813 | Great Britain | Aug. 19, 1938 |
| 685,394 | Great Britain | Jan. 7, 1953 |

OTHER REFERENCES

Publication—"Flow Controlled Coke Oven," by Didier Werke AG, recd. in Library Mar. 23, 1956 (26 pp. spec., 12 pp. dwg., FIGS. 9, 11, 14 and 15 primarily relied upon).